United States Patent
Apostolos et al.

(10) Patent No.: US 10,903,574 B2
(45) Date of Patent: Jan. 26, 2021

(54) LOW PROFILE ANTENNA—CONFORMAL

(71) Applicant: Antenum, Inc., Merrimack, NH (US)

(72) Inventors: John T. Apostolos, Lyndeborough, NH (US); Judy Feng, Nashua, NH (US); William Mouyos, Windham, NH (US)

(73) Assignee: Antenum, Inc., Merrimack, NH (US)

( * ) Notice: Subject to any disclaimer, the term of this patent is extended or adjusted under 35 U.S.C. 154(b) by 109 days.

(21) Appl. No.: 15/861,749

(22) Filed: Jan. 4, 2018

(65) Prior Publication Data
US 2018/0191072 A1 Jul. 5, 2018

Related U.S. Application Data

(60) Provisional application No. 62/442,087, filed on Jan. 4, 2017, provisional application No. 62/506,718, filed on May 16, 2017.

(51) Int. Cl.
| | |
|---|---|
| *H01Q 1/32* | (2006.01) |
| *H01Q 9/04* | (2006.01) |
| *H01Q 5/28* | (2015.01) |
| *H01Q 5/42* | (2015.01) |
| *H01Q 21/24* | (2006.01) |
| *H01Q 21/29* | (2006.01) |
| *H01Q 9/36* | (2006.01) |
| *H01Q 21/30* | (2006.01) |
| *H01Q 3/40* | (2006.01) |

(52) U.S. Cl.
CPC ......... *H01Q 9/0414* (2013.01); *H01Q 1/3233* (2013.01); *H01Q 1/3275* (2013.01); *H01Q 3/40* (2013.01); *H01Q 5/28* (2015.01); *H01Q 5/42* (2015.01); *H01Q 9/0428* (2013.01); *H01Q 9/36* (2013.01); *H01Q 21/24* (2013.01); *H01Q 21/29* (2013.01); *H01Q 21/30* (2013.01); *H01Q 1/3241* (2013.01)

(58) Field of Classification Search
CPC ...... H01Q 9/0414; H01Q 5/28; H01Q 1/3275; H01Q 9/0428; H01Q 1/3233; H01Q 5/42; H01Q 21/24; H01Q 21/29; H01Q 9/36; H01Q 21/30; H01Q 3/40; H01Q 1/3241
See application file for complete search history.

(56) References Cited

U.S. PATENT DOCUMENTS

| | | | |
|---|---|---|---|
| 9,147,936 B1 * | 9/2015 | Apostolos | H01Q 9/285 |
| 2017/0133756 A1 * | 5/2017 | Eastburg | H01Q 1/523 |

* cited by examiner

*Primary Examiner* — Dieu Hien T Duong
(74) *Attorney, Agent, or Firm* — David J. Thibodeau, Jr.; VLP Law Group LLP

(57) ABSTRACT

An antenna assembly operating in the AM/FM, 3G and 4G cellular, WiFi, Bluetooth, satellite and 5G bands. The assembly provides a wide bandwidth, orientation dependent, directional antenna via volumetric radiating elements that conformal to exterior surface(s) of a vehicle such as a passenger car. The volumetric antenna elements may be further controlled by embedded components and/or surrounded by controllable ground plane elements. In one application, the antenna may be used to detect a direction of approach by person to, for example, operate only certain door locks.

6 Claims, 52 Drawing Sheets

* Conformal, multi-nested array configuration for 700 MHz-3,800 MHz coverage
* Hemispherical or monopole pattern coverage; multiple, simultaneous beams
* Directional, polarization, and spatial MIMO capability
* 5.125 x 5.125 x 0.5 in, completely conformal form factor
* Growth to 5G and V2V Radome not shown 5.125 in. x 5.125 in x 0.5 in
Including Mounting Flange

* Conformal, multi-nested array configuration for 700 MHz-3,800 MHz coverage
* Hemispherical or monopole pattern coverage; multiple, simultaneous beams
* Directional, polarization, and spatial MIMO capability
* 5.125 x 5.125 x 0.5 in, completely conformal form factor
* Growth to 5G and V2V

Advantages of CALPRO Array

Significant advantages over traditional Conformal Quad Slot Array approaches--Smaller, simpler, cheaper, more features

|  | CALPRO Array | Quad Slot Arrays |
|---|---|---|
| Bandwidth | Wide band | Narrow band |
| Size | 5.125 x 5.125 x 0.5 | Multiple arrays needed, would be much larger |
| Conformal | Yes | Yes |
| Multi-Function | One structure for all bands | Multiple structures needed |
| Directionallity | Yes | No |
| FM/AM | Enhanced Performance | Not practical |

*FIG. 25*

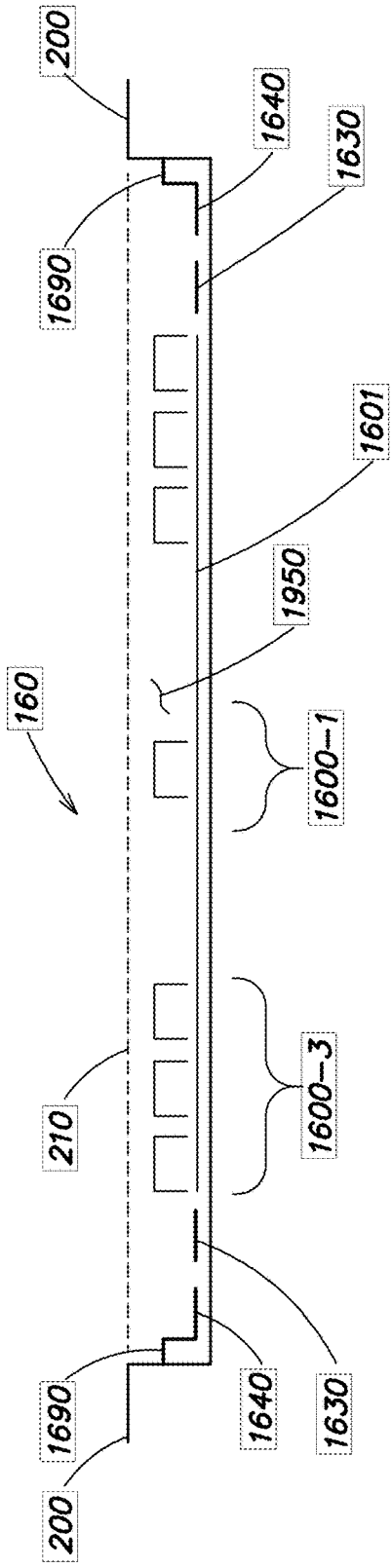
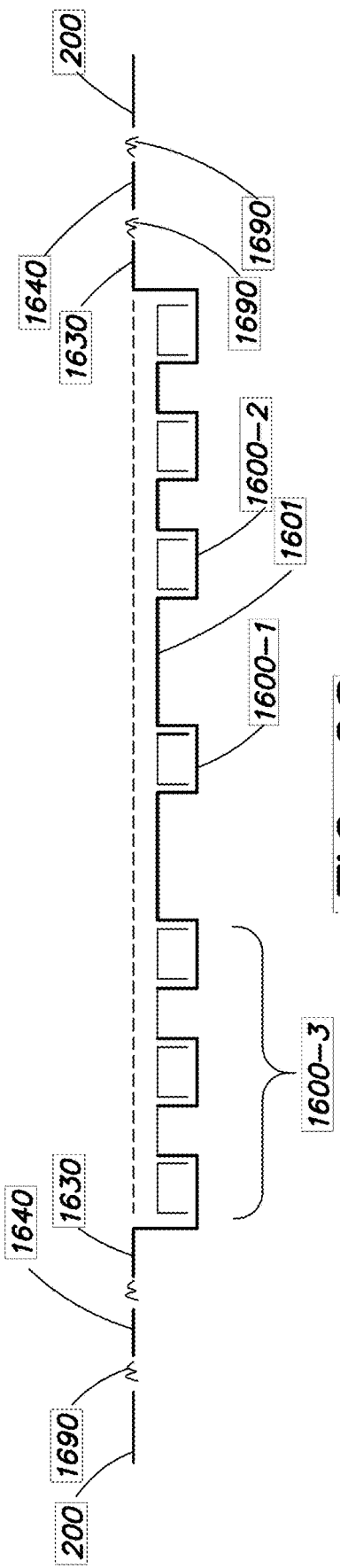

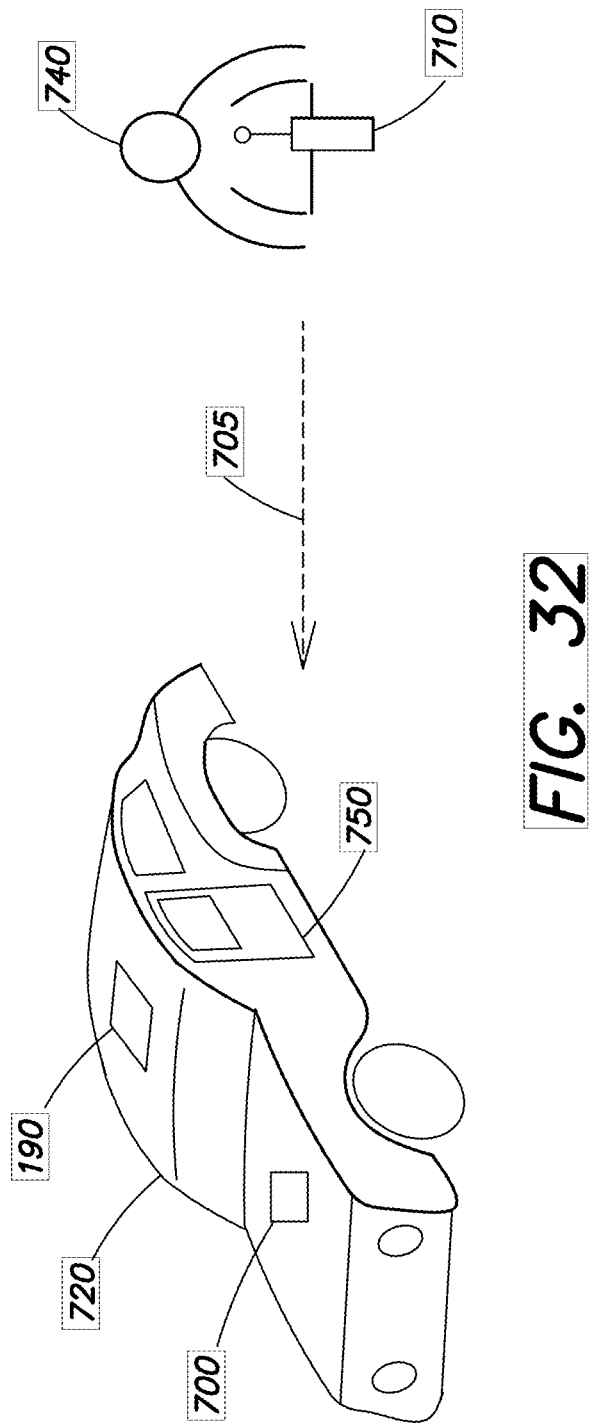

LOW PROFILE ANTENNA—CONFORMAL

CROSS REFERENCE TO RELATED APPLICATIONS

This patent application claims priority to U.S. Provisional Application entitled "Vehicle Roof Antenna With Orientation Independent Beamforming", Ser. No. 62/442,087 filed Jan. 4, 2017 and to a U.S. Provisional Application entitled "Low Profile Antenna—Conformal", Ser. No. 62/506,718 filed May 16, 2017, the entire contents of both of which are hereby incorporated by reference.

BACKGROUND

Technical Field

This patent application relates to antennas and more particularly to a low-profile, conformal antenna array suitable for operating across a wide range of frequencies including AM/FM, 3G/4G, cellular, Wi-Fi, Bluetooth, GPS, satellite radio, and even proposed 5G wireless and vehicle-to-vehicle bands.

Background

Antennas have long been attached to and even embedded in certain portions of vehicles. One common approach implements the antenna as a conductive wire trace deposited onto a rear window. However, window antennas have drawbacks, such as reduced visibility out of the window, directional sensitivity, and degradation due to sun exposure over time. So-called shark fin antennas have come into use since the late 1990's. These roof mounted assemblies, approximately 6 inches or so in length, are encased in an aerodynamic or other visually pleasing housing. However, shark fins protrude from the vehicle body and their shortened length sometimes to compromise reception.

A directional antenna formed of multiple radiating elements can provide a concentrated signal or beam in a selected direction to increase antenna gain and directivity. But since vehicle design is often dictated by styling, the presence of numerous protruding antennas is not desirable. Directional antenna arrays often have complex shapes and large size, making them difficult to package in a vehicle.

It is also preferable to conceal the antenna components to protect them from the elements and to preserve vehicle aesthetics. In order to conceal the antenna, it might be considered to be desirable to locate the radiating elements beneath or conformal to the sheet metal body of a vehicle. However, the presence of large expanses of sheet metal is commonly thought to adversely affect antenna performance.

SUMMARY

Miniaturized antennas can be provided using planar, volumetric conductors fed through frequency-dependent impedance elements such as meander lines. By arranging these components in an appropriate configuration, the electrical properties of the antenna can be passively and/or automatically optimized over a wide bandwidth. In one arrangement, a conductive surface placed over a conductive cavity serves as a primary radiator, and other components, such as meander line components, embedded within or coupled to the conductive cavity. This approach is particularly useful in vehicle applications since no part of the antenna needs to protrude beyond the skin of the vehicle. The approach can also be adapted to wireless devices and laptop computers and the like where the antenna height can be minimized.

In one particular implementation, an antenna array constructed in accordance with the teachings herein consists of four circular polarized, orientation independent sub-arrays, typically in a square configuration. Each orientation-independent sub-array may respond to Right-Hand Circularly Polarized (RHCP) and/or Left Hand Circularly Polarized (LHCP) energy with separate ports for each polarization. Diversity may be provided by generating orthogonal sine and cosine beams which may be created by subtracting diagonally juxtaposed orientation-independent array elements. Operating modes may provide four orthogonal, simultaneous, unidirectional beams 0, 90, 180, and 270 degrees at the RHCP and LHCP ports.

In some implementations, a beamforming array, which may be composed of two or more sub-arrays of volumetric elements that are each directionally controllable, is further surrounded by one or more additional conductive surfaces that act as controllable ground plane elements. Passively reconfigurable surface impedances may operate as a frequency dependent coupling between the central array and the ground plane elements(s). The surrounding ground plane elements may be further connected to cavity walls with the passively reconfigurable couplings.

The low-profile structure may be located in close proximity to the sheet metal of a vehicle roof or trunk and integrated within a nonmetallic radome.

BRIEF DESCRIPTION OF THE DRAWINGS

The description below refers to the accompanying drawings, of which:

FIG. 25 is a list of some of the advantages of the antenna arrays described herein.

FIG. 27 is a cross-sectional view.

FIG. 28 is another cross-sectional view.

FIG. 32 illustrates a use of the antenna array.

DETAILED DESCRIPTION OF AN EMBODIMENT

Figure 1B:
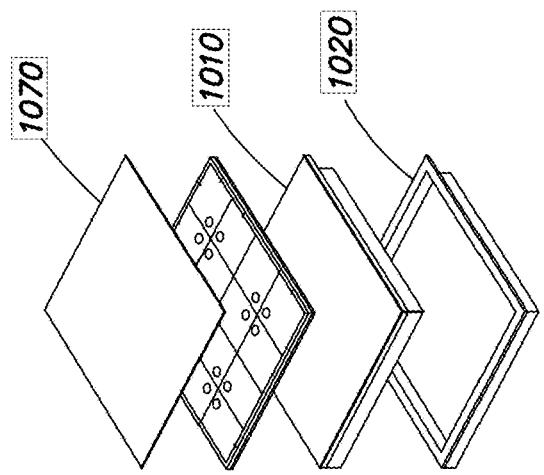
FIGS. 1A, 1B and 1C are views of the conformal, low-profile antenna structure.
Figure 1C:
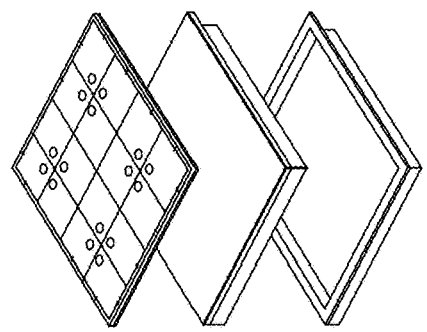
Figure 1A:
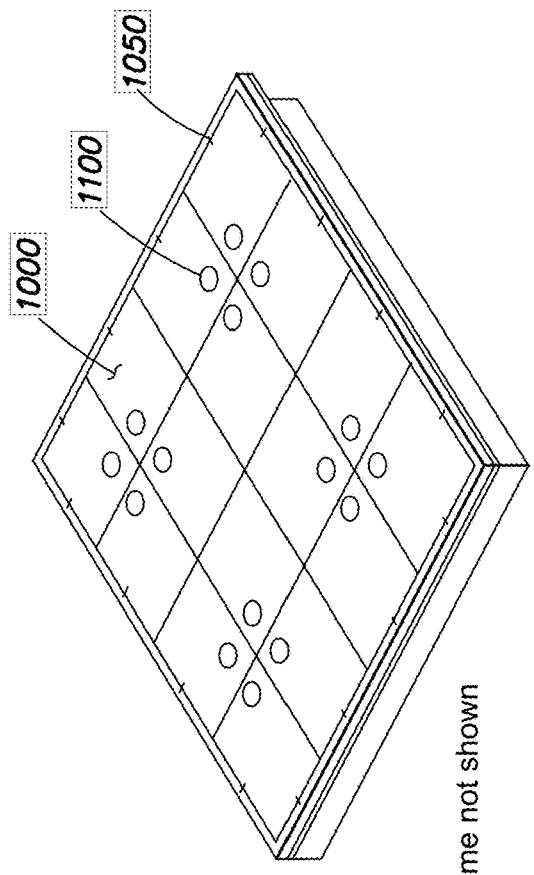

FIG. 1A is an isometric view of a Low Profile Conformal antenna (referred to as a LOPAC or CALPRO antenna structure herein). The structure consists of a number of planar conductive surfaces or patches 1000 arranged in multiple 4×4 arrays. As shown in the exploded views of FIGS. 1B and 1C, the conductive surfaces are disposed in or near a reference plane 1010 over a cavity 1020. An optional radiation-transparent cover or radome 1070 may be placed over the patches 1000.

The cavity 1020 may be defined by vertical conductive walls and/or incorporate portions of the vehicle body components such as a roof. A number of frequency selective coupling elements 1050 such as meanderlines connect the patches to one another and/or to the surrounding vehicle surfaces or cavity walls. These selective couplings are for tuning the structure across many different frequency bands. For example, in one embodiment the singular structure shown in FIG. 1A can cover the AM/FM, 3G and 4G cellular, satellite, Wi-Fi, Bluetooth, GPS, 5G cellular and vehicle to vehicle (V2V) frequency bands. The entire structure may take a form factor at a 5.125"×5.125"×0.5" assembly.

In the illustrated configuration, the 16 individual patches 1000 are arranged in four groups of four to provide for orientation independent volumetric antenna arrays. This type of antenna array is described in our previous patents such as U.S. Pat. No. 9,147,936 entitled "Low-Profile, Very Wide Bandwidth Aircraft Communications Antennas Using Advanced Ground-Plane Techniques," as well as U.S. patent application Ser. No. 15/362,988 filed Nov. 29, 2016 entitled "Super Directive Array of Volumetric Antenna Elements for Wireless Device Applications," and U.S. patent application Ser. No. 62/432,973 filed Dec. 12, 2016 entitled "Volumetric Antenna Element Array for 4G 5G Bluetooth WIFI GPS Satellite," the entire contents of all of which are hereby incorporated by reference.

Disposed on the top surface of one or more of the individual patches is a circular array structure 1100 designed to operate in the 5G band. These volumetric, cylindrical structures may take the form of the circular arrays as described in co-pending U.S. patent application Ser. Nos. 15/362,988 and 62/432,973 incorporated by reference herein. The circular arrays may be located at the inside corners, near where the four patches in each subarray meet. Also each patch may serve as a ground plane for a respective one of the 5G circular arrays.

Figure 2:
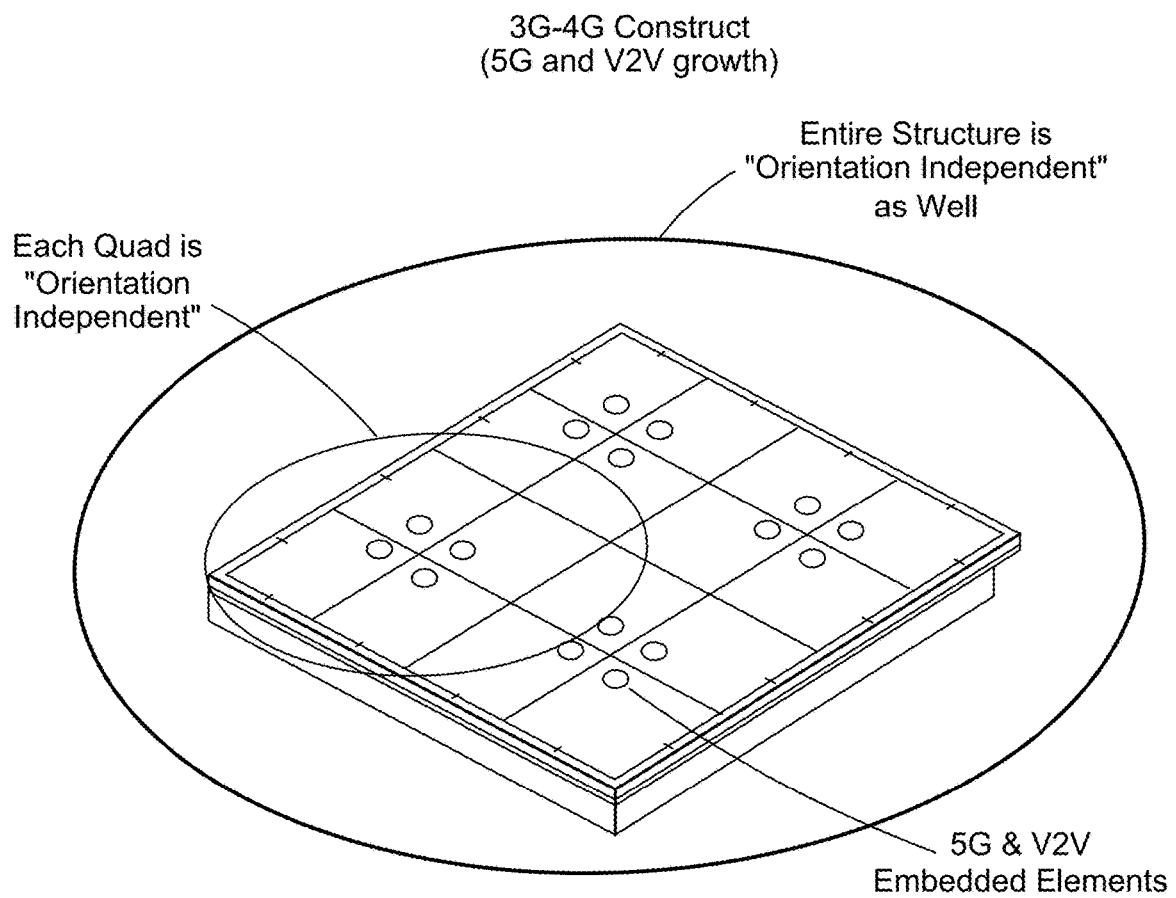
FIG. 2 illustrates how each quad sub-array is itself an orientation-independent array element, and how the entire array structure may also be a orientation independent structure operating in a different frequency band.

As shown in FIG. 2, each group of four adjacent patches is itself a "quad" subassembly that is an Orientation Independent volumetric antenna. The 16 patches may thus be configured to provide four sub-arrays, with each sub-array having four radiating elements operating at 4G and/or WIFI frequencies. Frequency selective couplings such as meanderlines may be used to connect the patches in each subarray together, so that they are responsive at other frequency ranges such as at 3G frequencies lower than the 4G frequencies of each patch 1000. Here, the four elements circled on the upper left may be shorted together by the frequency selective couplings. Likewise, the other three groups of four elements may be shorted together. The result is a four element orientation-independent array responsive at the lower frequency range.

Other frequency selective couplings ensure the 16 patches are all shorted together at other frequencies, to provide an effective single conductive patch. This configuration may be used at AM/FM frequencies.

This conformal, multi-nested array configuration can provide operation across 600 MHz to 3800 MHz range as will be evident in more detail below. Hemispherical or monopole patterns can be provided as well as multiple and simultaneous antenna beams. Direction, polarization and spatial Multiple Input Multiple Output (MIMO) capability can also be provided.

Figure 3:
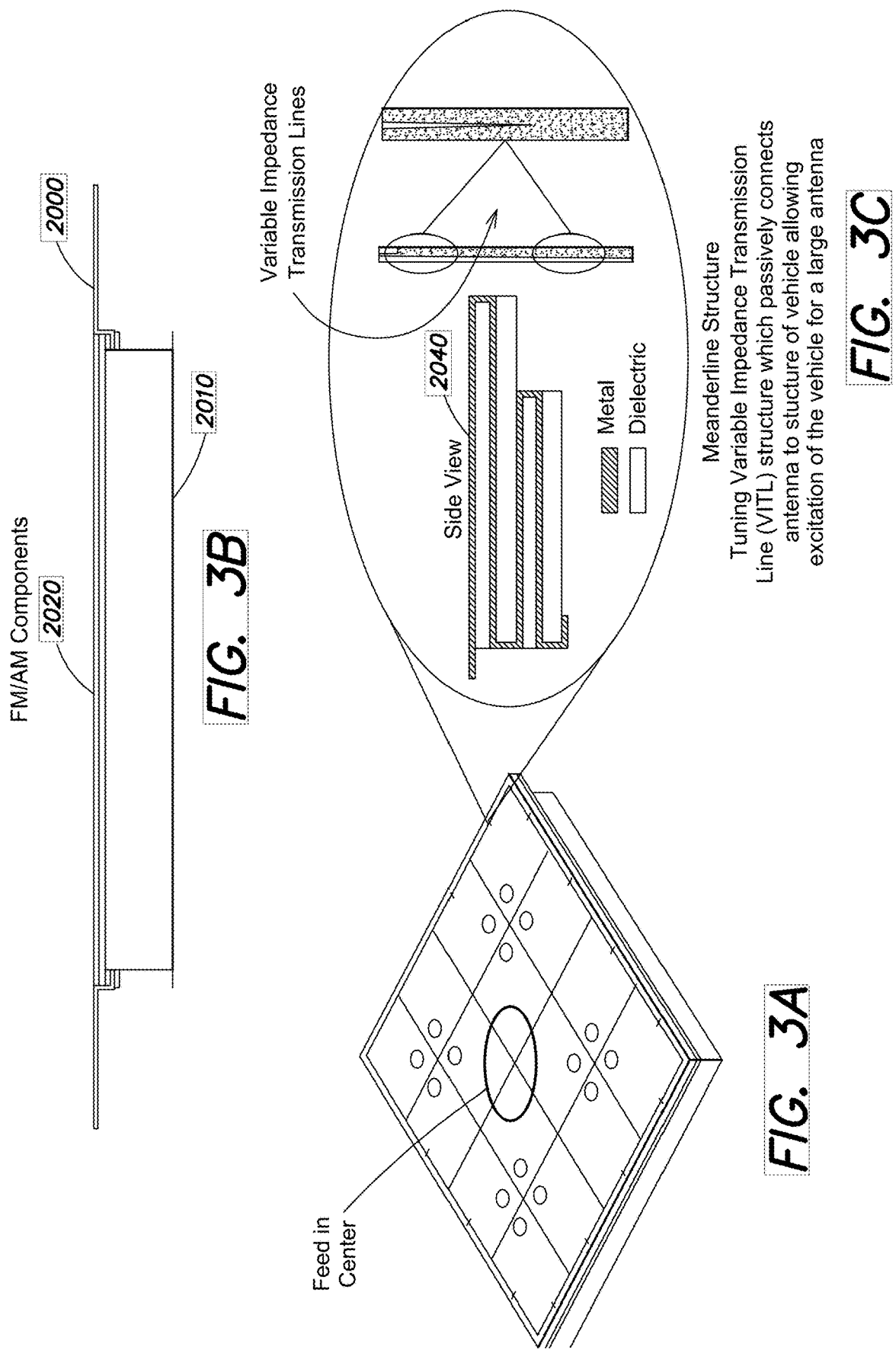
FIGS. 3A, 3B and 3C show an AM/FM configuration.

FIGS. 3A, 3B and 3C shows a configuration for operation in the AM/FM frequency band. FIG. 3A is an isometric view similar to FIG. 1A. As shown in the cross-sectional view of FIG. 3B, a reference plane 2000 is provided by the roof of a vehicle or other metallic surface such as the boot, trunk, hood or fender. A cavity 2010 is disposed beneath the reference plane. The antenna radiating elements 2020 are in line with or otherwise in a defined position with respect to the reference plane, over the cavity. The meander lines 2040 or other frequency selective connections (shown in detail in FIG. 3C) are responsive at such frequencies in the AM and FM band to act as a short, and connect all 16 conductive elements together. A single feed point is provided at or near the center. As shown in the detail of FIG. 3C, an example meander line may be one or more tunable variable impedance transmission line structures which passively connect the antenna to the surrounding structure of the vehicle allowing the excitation of the vehicle itself. More discussion of this type of operation is described in our co-pending U.S. Patent Application entitled "AM/FM Directional Antenna Array for Vehicle," Ser. No. 62/432,988 filed Dec. 12, 2016, the entire contents of which are hereby incorporated by reference. The roof and pillars that support the roof become part of the AM/FM radiating structure.

Figure 4:
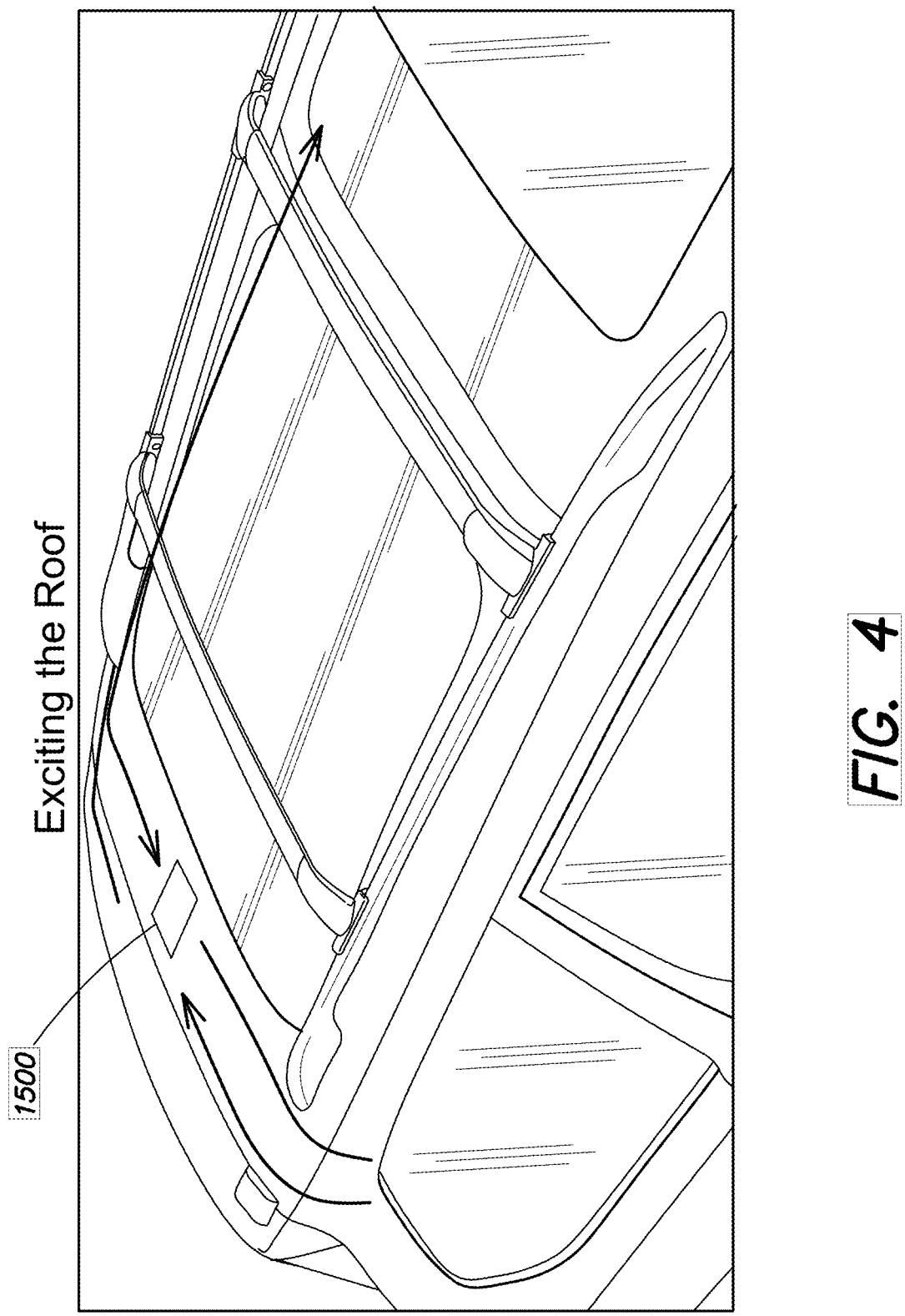
FIG. 4 illustrates the array structure embedded in the roof of a vehicle.

FIG. 4 is an illustration of the CALPRO antenna structure 1500 embedded in the rear portion of the roof of a sport-utility vehicle.

Figures 5A, 5B:
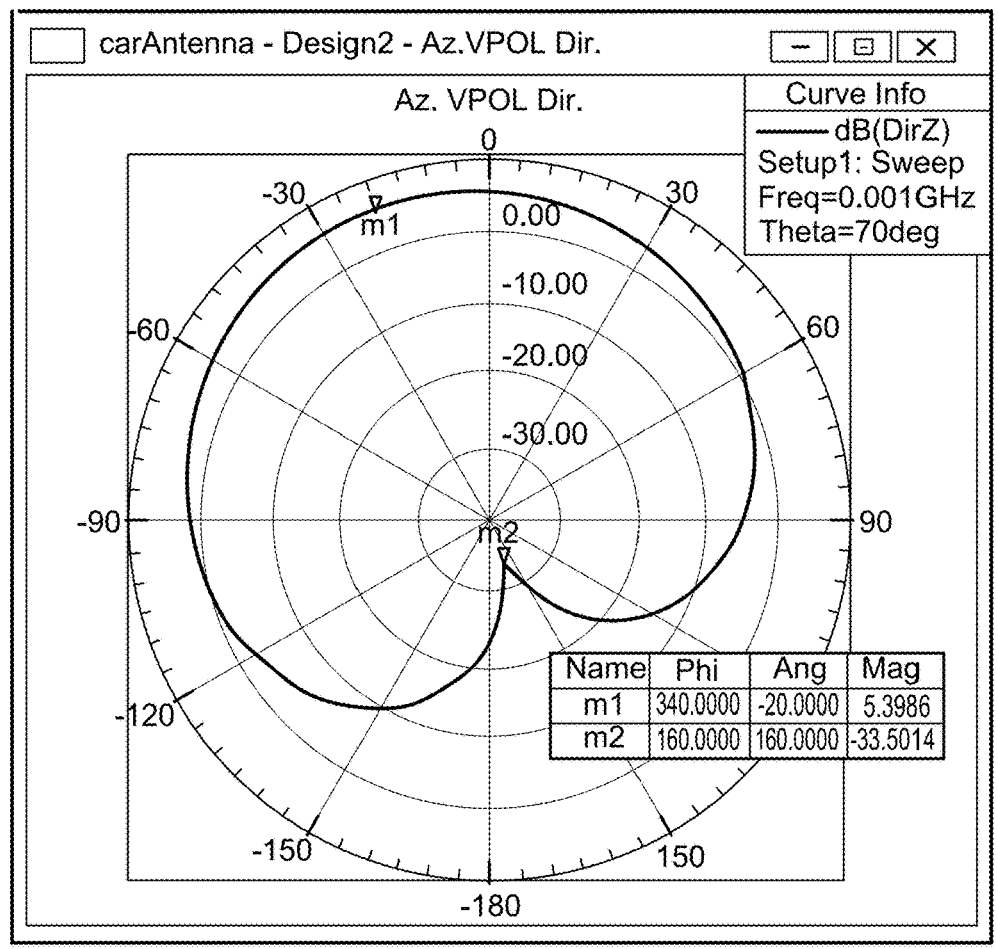
FIGS. 5A, 5B and 5C illustrate available gain when the structure is arranged to excite metallic pillars supporting the vehicle roof.
Figure 5C:
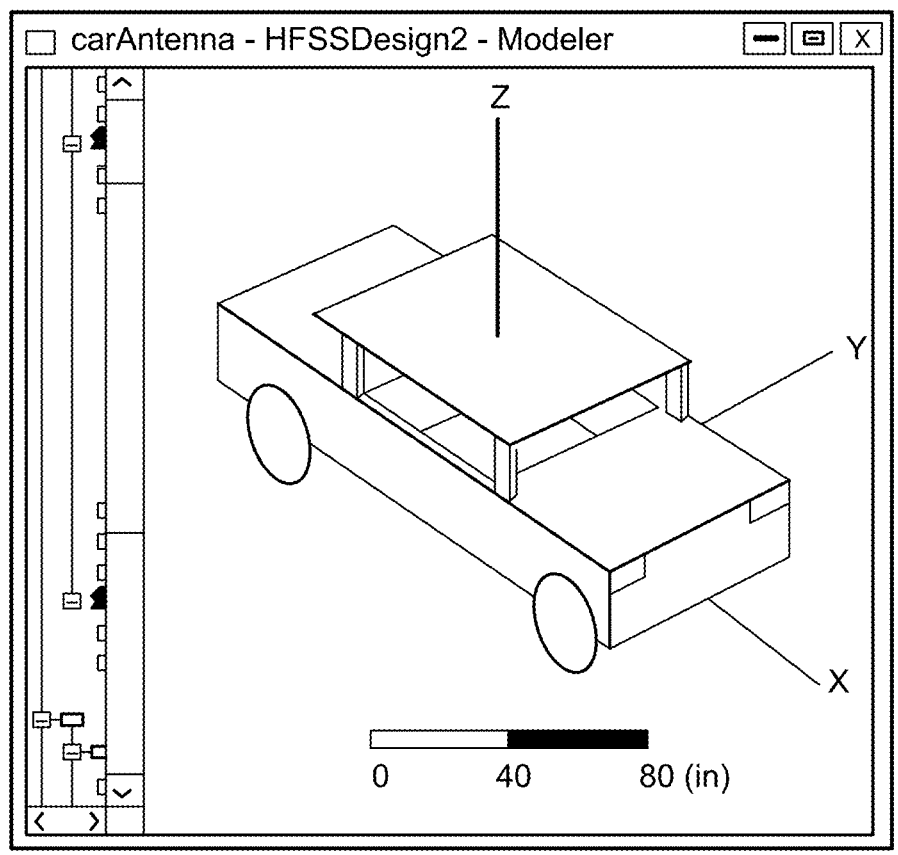

FIGS. 5A, 5B and 5C show a result from simulating a structure that excites the vertical pillars of the vehicle and the resulting available directivity. Exciting the array from the bottom turns the cab of the vehicle into a volumetric directional antenna. Gains of approximately five dBi are expected with nulls approaching −30 dBi. A similar approach is possible when feeding from the top with the CALPRO.

If a car is a convertible or has a sun roof (or maybe a luggage rack that covers the entire roof), then instead of using one CALPRO on the roof, one might opt for two CALPRO antennas, one on the hood and one on the trunk, operating in concert. In fact, one could have multiple (i.e. an array of) CALPROs operating in concert for any ground vehicle (or aircraft) to guarantee complete spherical coverage.

Figure 6:
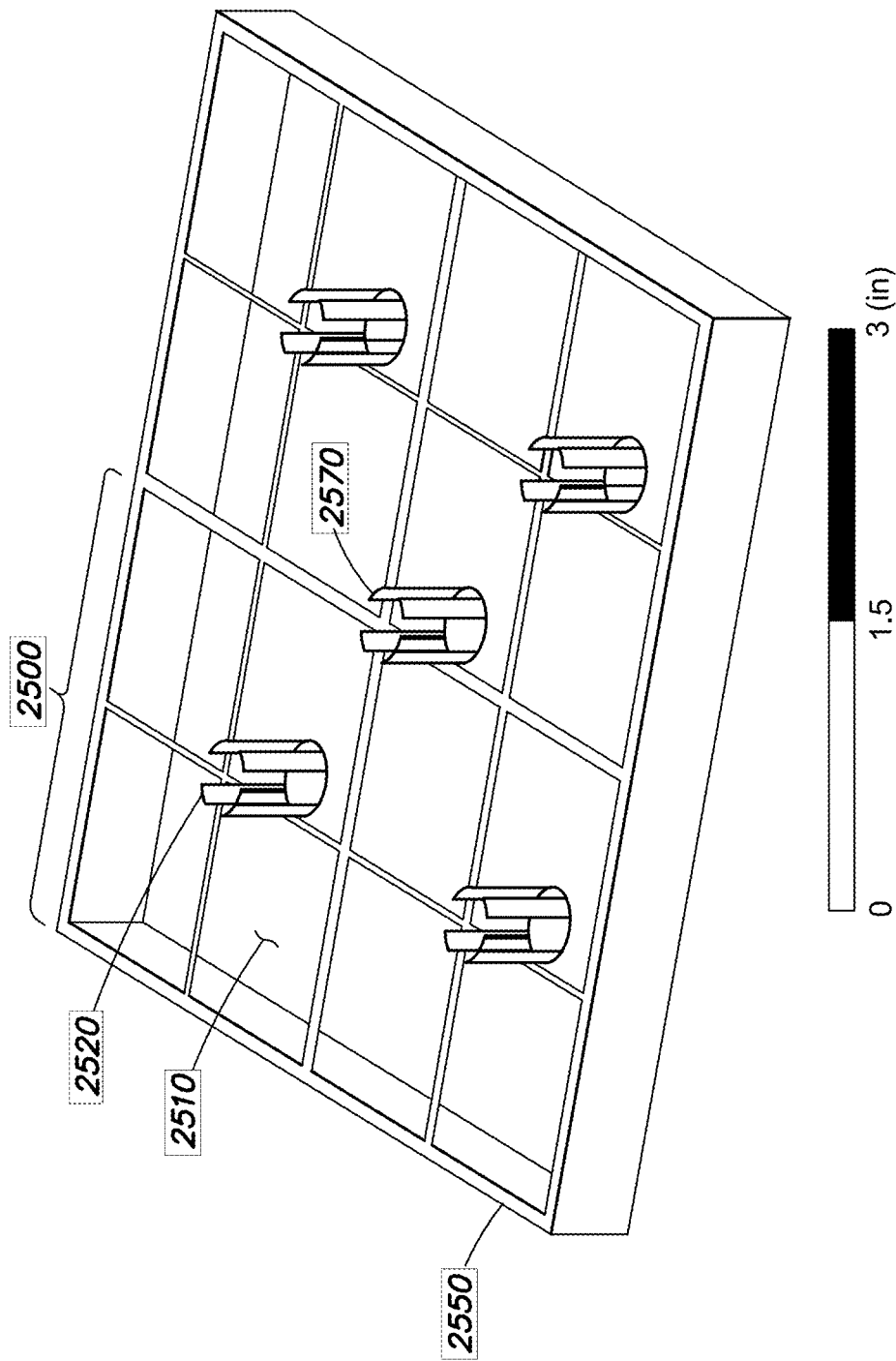
FIG. 6 illustrates how the separate orientation-independent sub-arrays may be fed.
Figure 7B:
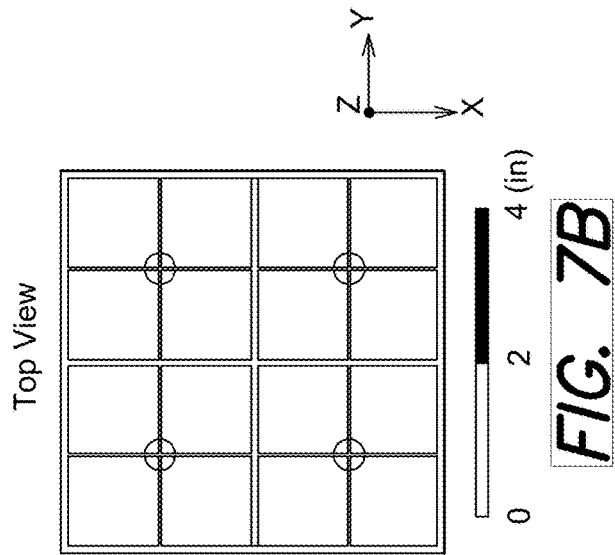
FIGS. 7A, 7B, 7C and 7D show 3-D, top, and x- and y-side views of the structure.
Figure 7D:
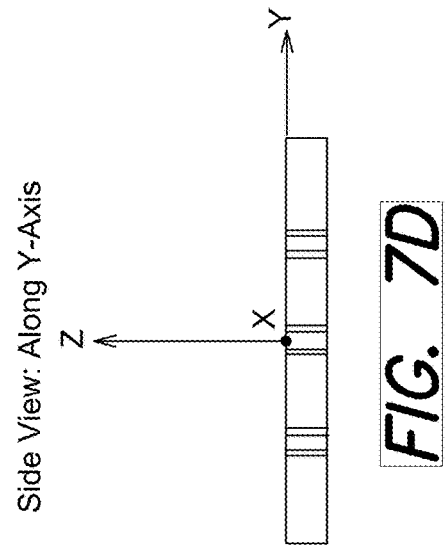
Figure 7A:
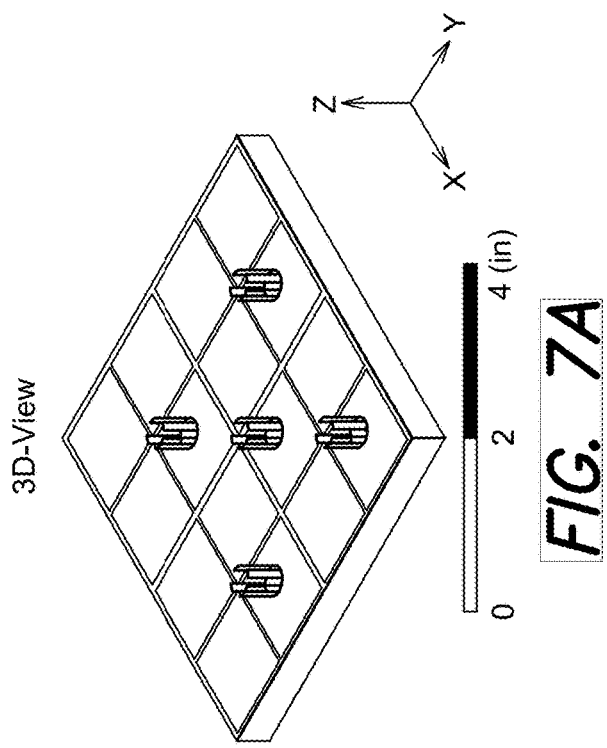
Figure 7C:
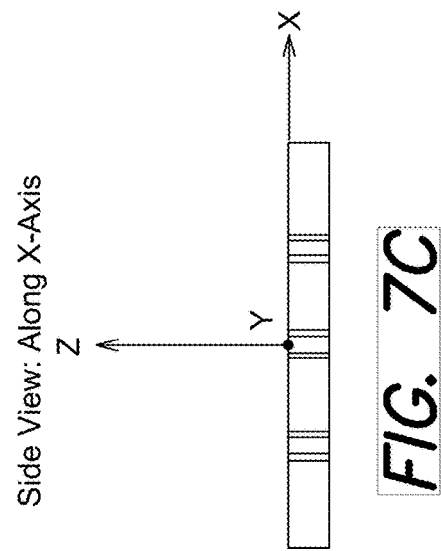

FIG. 6 shows the array configured for operation in frequency bands such as 700-900 MHz or 3G cellular. In this mode, each group 2500 of four radiating elements 2510 is combined with the meander line structures as per the prior figures. Each of these subassemblies are then fed with a respective feed structure 2520 disposed beneath the reference plane 2550. The four feeds individually excite the four radiating elements. A center feed 2570 may also provide a unidirectional mode.

FIGS. 7A, 7B, 7C and 7D are three-dimensional isometric, top, and X- and Y-side views of this arrangement.

Figure 8:
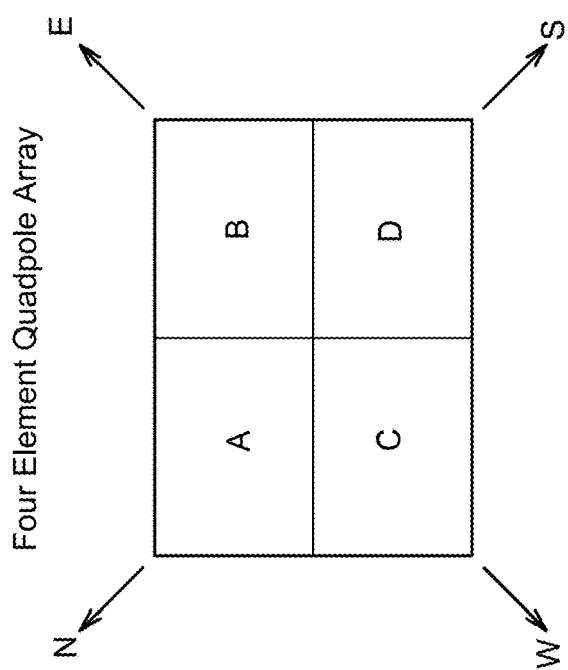
FIG. 8 is a schematic of a four element orientation-independent subarray.

It is possible to provide directional operation of the LOPAC quad array as follows. With reference to FIG. 8, directional beams may be generated by the four element orientation-independent antenna array simultaneously using the combining network shown in FIG. 9. Optional polarization switch matrices may be used to provide each of a right hand circular (RHCP) and left hand circular (LHCP) polarization part. Each polarization matrix may be as described in our co-pending U.S. patent application Ser. No. 15/362,988 referenced above (with specific reference to the switch matrix configurations in FIGS. 8A-8C and FIGS. 9A-9H therein).

More particularly, the four orientation-independent patch elements (as labelled A, B, C, and D in FIG. 8 herein) can be combined with the 180° hybrids 2600 and 90° quads 2610 to generate four high gain beams in the ordinal N, S, E, W directions. The beams are generated simultaneously using the combining network shown in FIG. 9.

If separate polarization networks are provided for each of the right hand (RH) and left hand (LH) polarization, the respective outputs from the A, B, C, and D patches can each be applied to a respective combining network to simultaneously generate both RH and LH modes in the N, S, E, W directions.

A monopole pattern for both RH and LH polarizations may be generated by applying phase weights to A, B, C, D in the following manner:

$$e^{i(0)}A\ e^{i(90)}B\ e^{i(180)}D\ e^{i(270)}C$$

This weighting scheme produces an omni directional pattern with a null at the zenith and maximum gain at the horizon for both LH and RH polarizations.

Orthogonal sine and cosine modes may also be simultaneously generated by subtracting the diagonally juxtaposed elements A-D and B-C. Both the RH and LH polarization outputs of A, B, C, D are applied giving rise to four orthogonal outputs:

$$(A-D)_{RH}(B-C)_{RH}(A-D)_{LH}(B-C)_{RH}$$

If, of course, polarization is not desired, than the polarization network may be eliminated.

Figure 9:
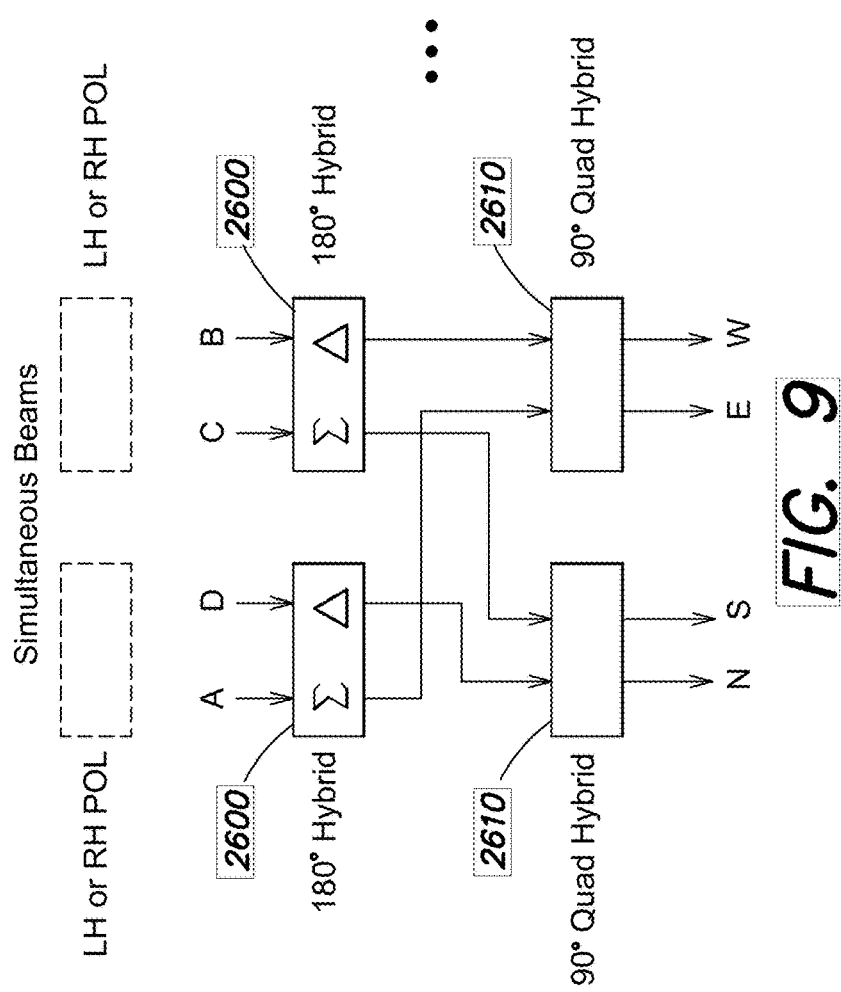
FIG. 9 shows how four high beams in the ordinal North, South, East, and West directions may be generated simultaneously for a given polarization.

The combining network of FIG. 9 can be provided for each of the nested configurations in both of the 3G and 4G operating modes. So, for example, the 3G configuration (where the four elements of each sub-array are shorted together) may have its own combining network of FIG. 9; and the 4G configuration (with 4 arrays each with four conductive elements A, B, C, D), may use four combining networks for each of the RH and LH polarization ports.

Figure 10:
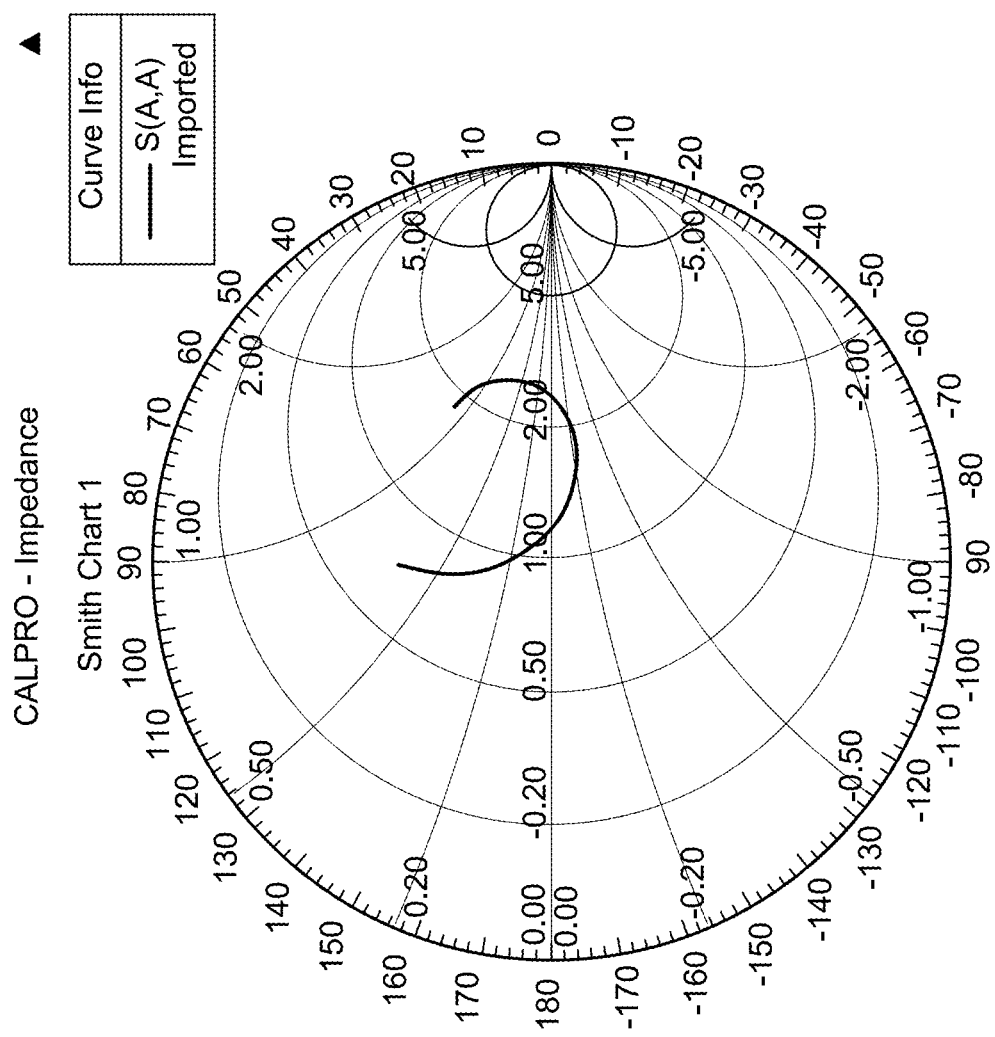
FIG. 10 is a Smith chart showing impedence.

FIG. 10 shows a Smith chart for the LOPAC antenna (referred to as a CALPRO antenna in this and in other drawings).

Figure 11:
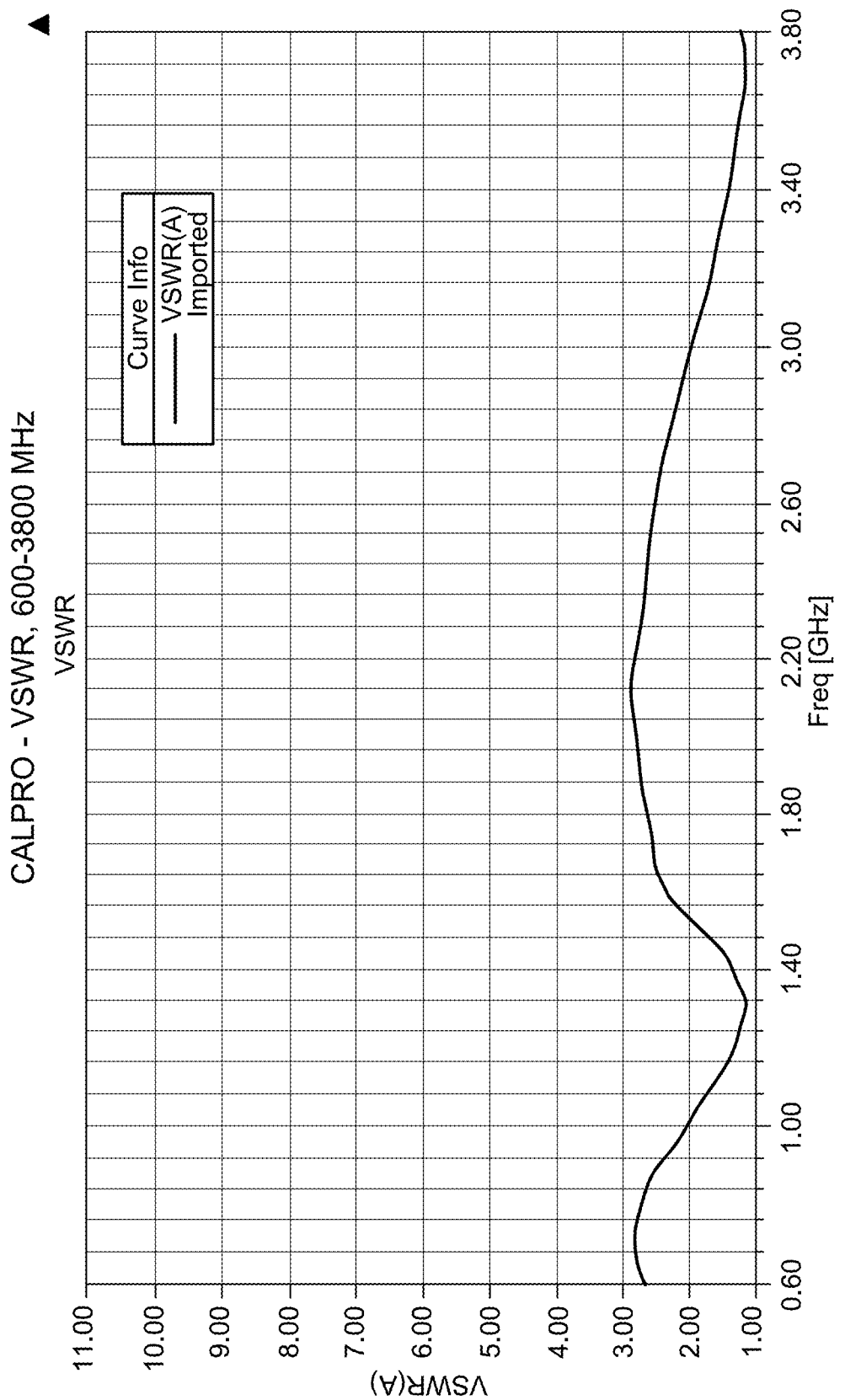
FIG. 11 is a Voltage Standing Wave Ratio (VSWR) plot from 600 MHz to 3800 MHz.

FIG. 11 illustrates Voltage Standing Wave Ratio (VSWR) over a range of 600 to 3800 MHz. Relatively uniform performance as seen across the expected operating range. Several of the following figures show results of simulation of a monopole mode and directional mode.

Figure 12:
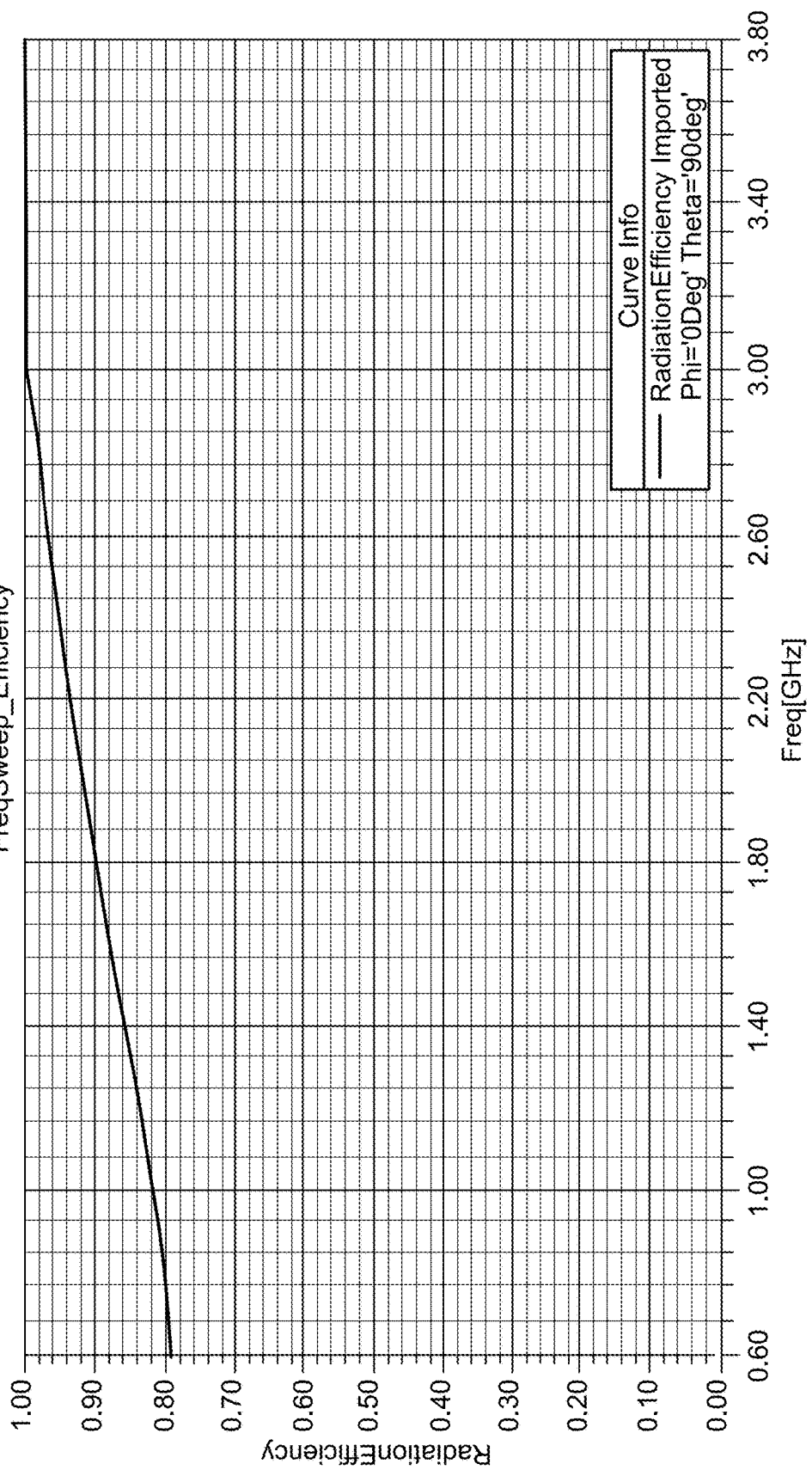
FIG. 12 shows frequency sweep efficiency in a monopole mode.

For example, FIG. 12 shows frequency sweep efficiency in a monopole operating mode.

Figure 13:
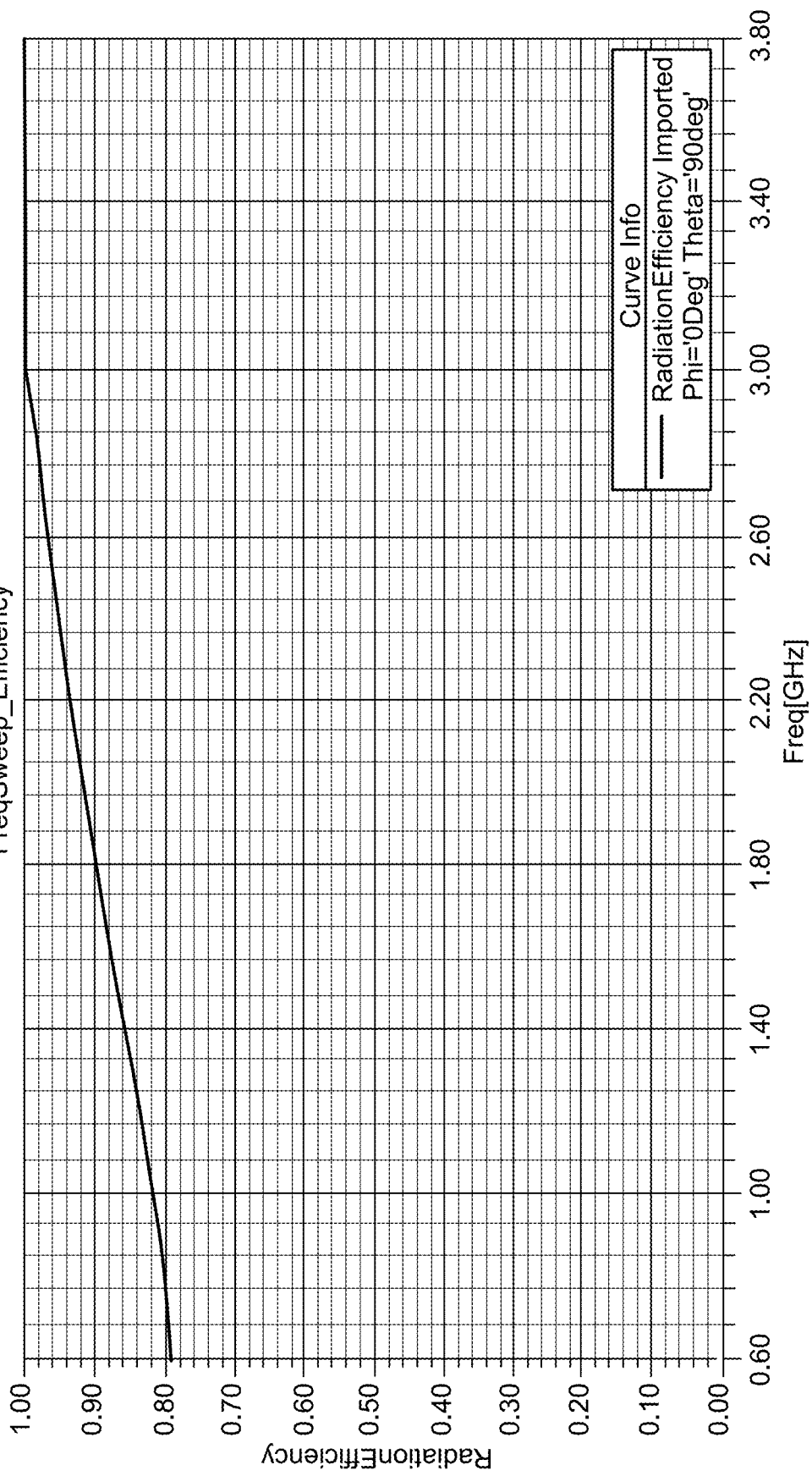
FIG. 13 shows frequency sweep efficiency in a combined quad directional mode.

FIG. 13 shows frequency sweep efficiency in the directional combined.

Figure 14:
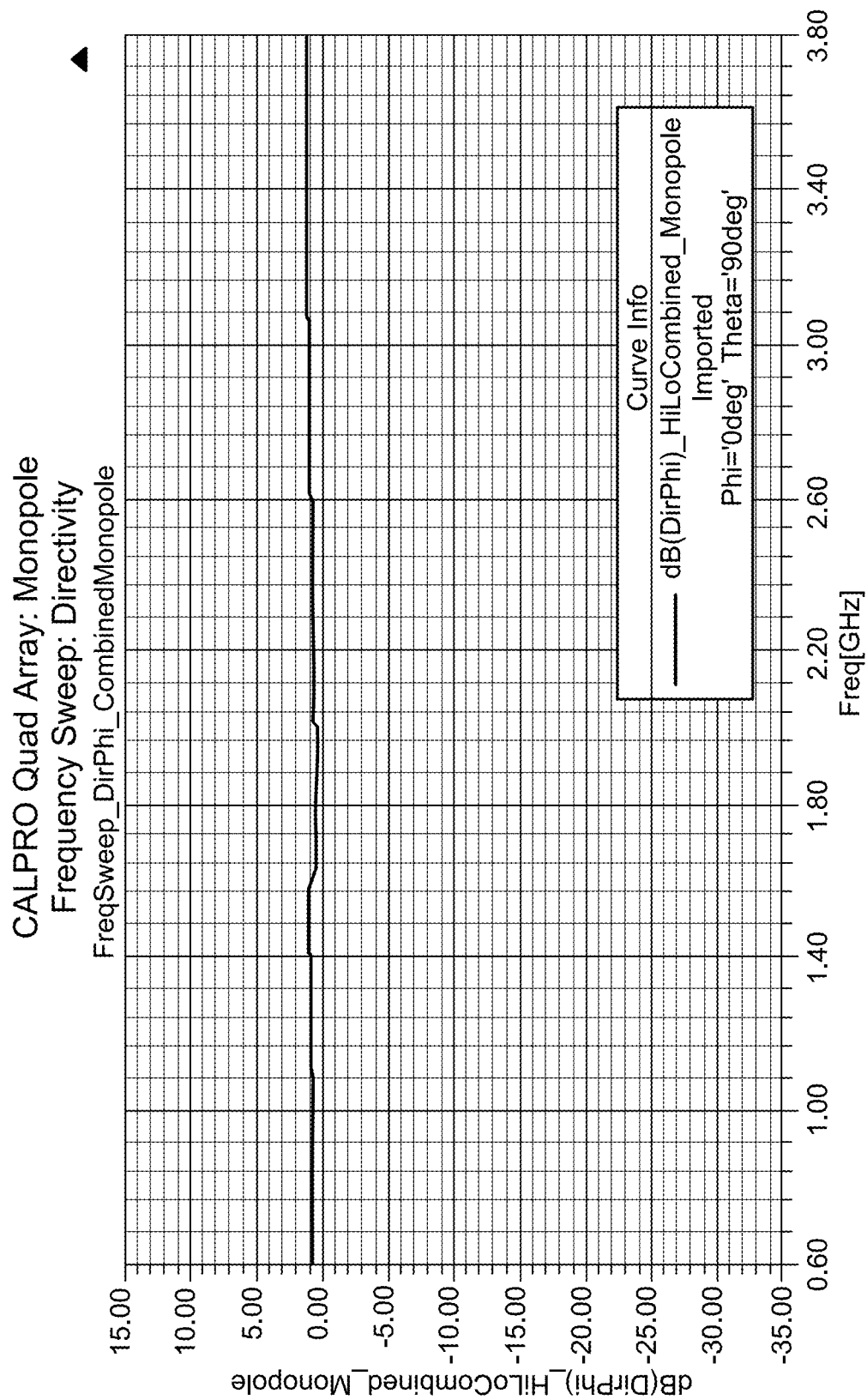
FIG. 14 shows the frequency sweep directivity in a monopole mode.
Figure 15:
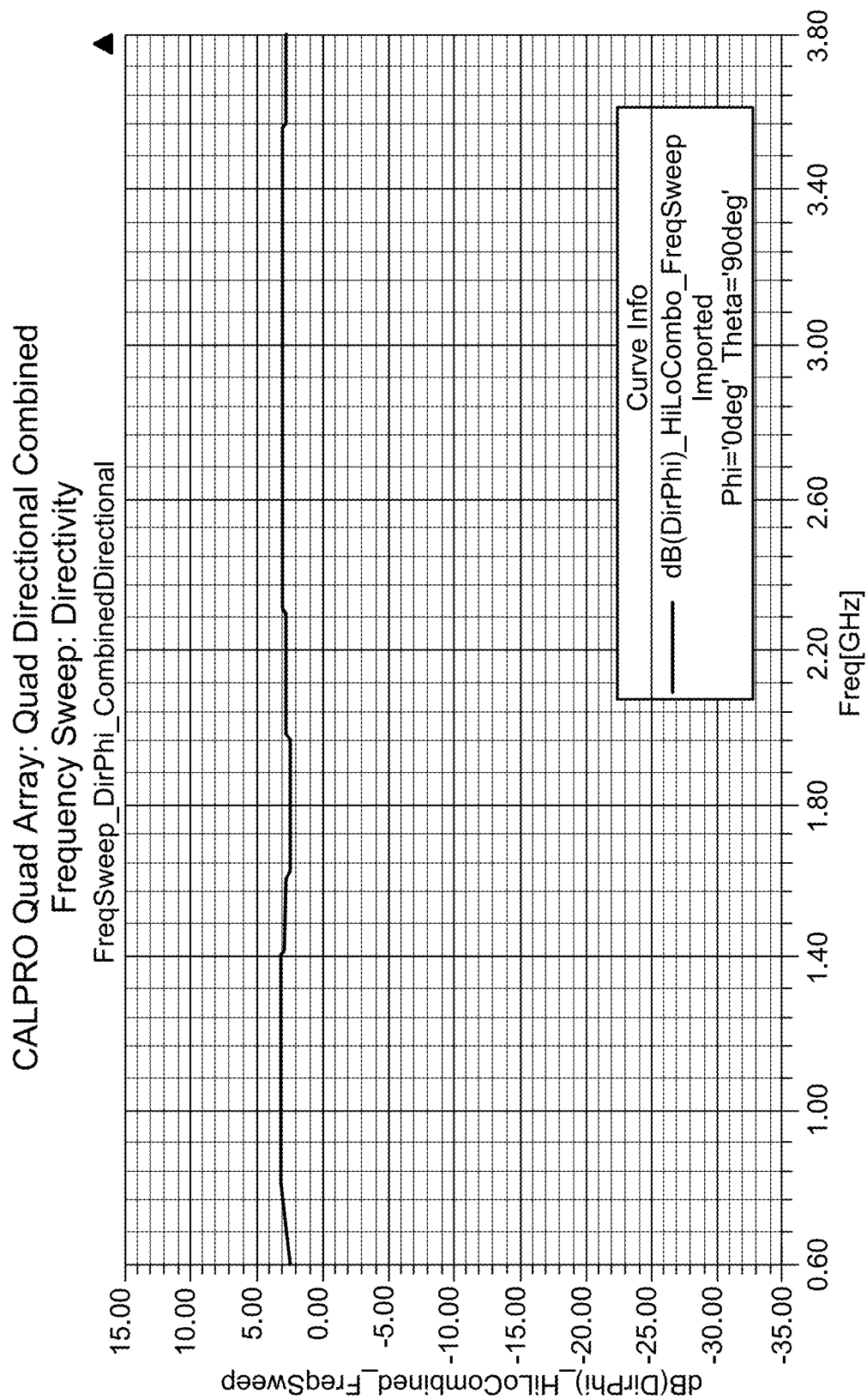
FIG. 15 shows frequency sweep directivity in the combined directional mode.
Figure 16A:
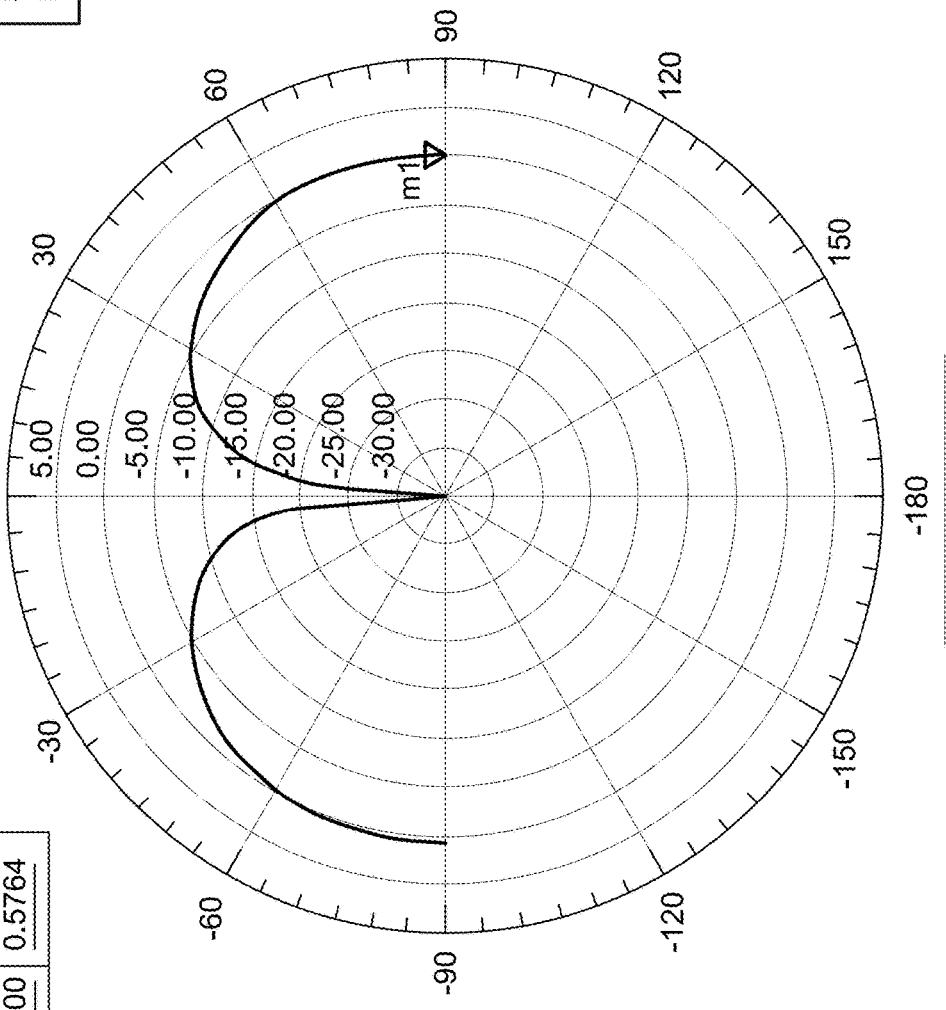
FIGS. 16A-16D illustrates monopole azimuth patterns for different frequencies.
Figure 16B:
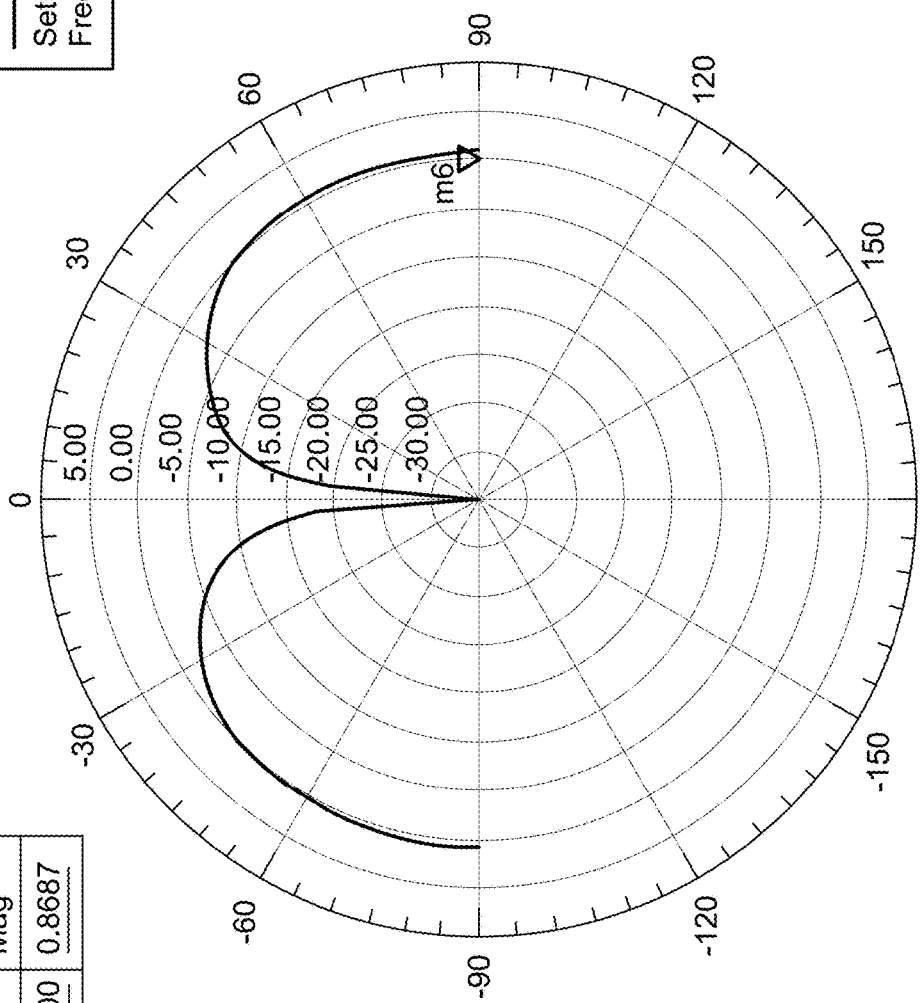
Figure 16C:
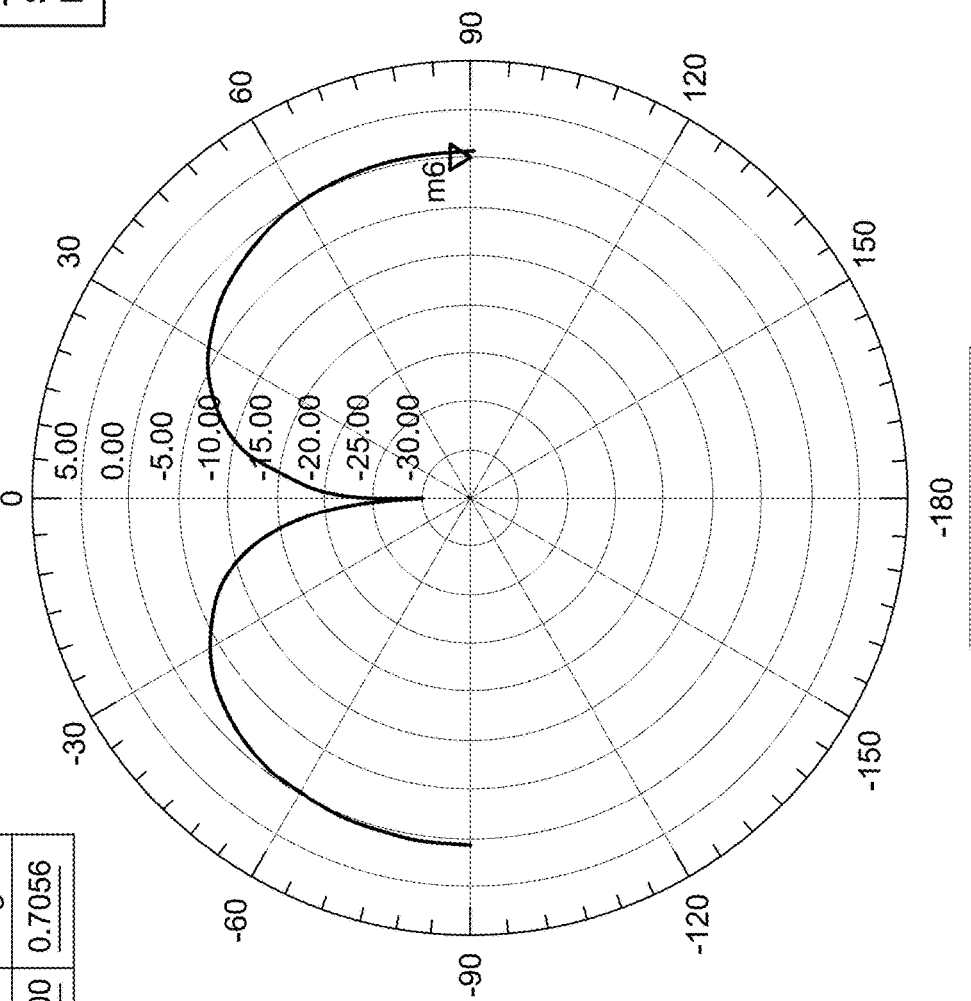
Figure 16D:
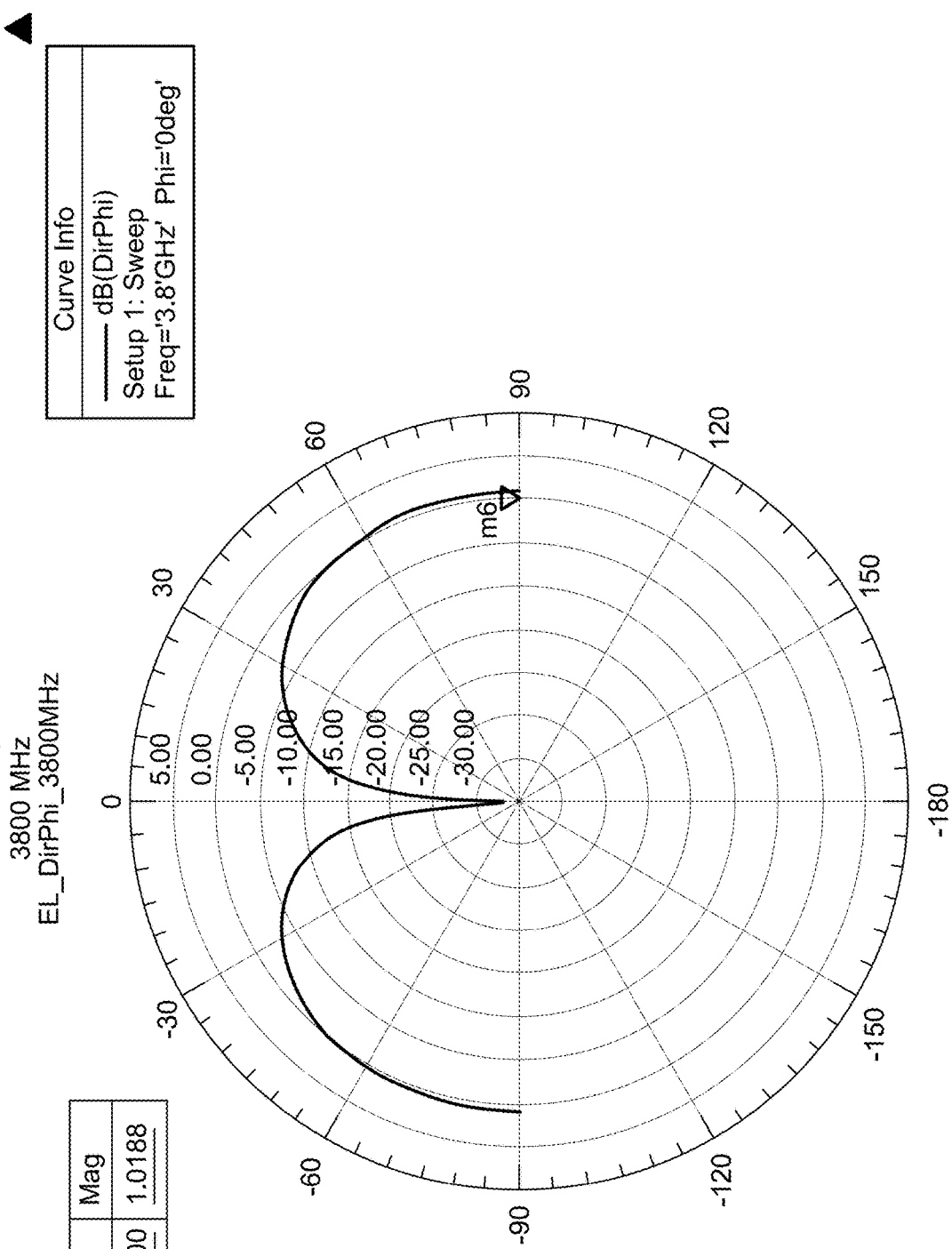
Figure 17A:
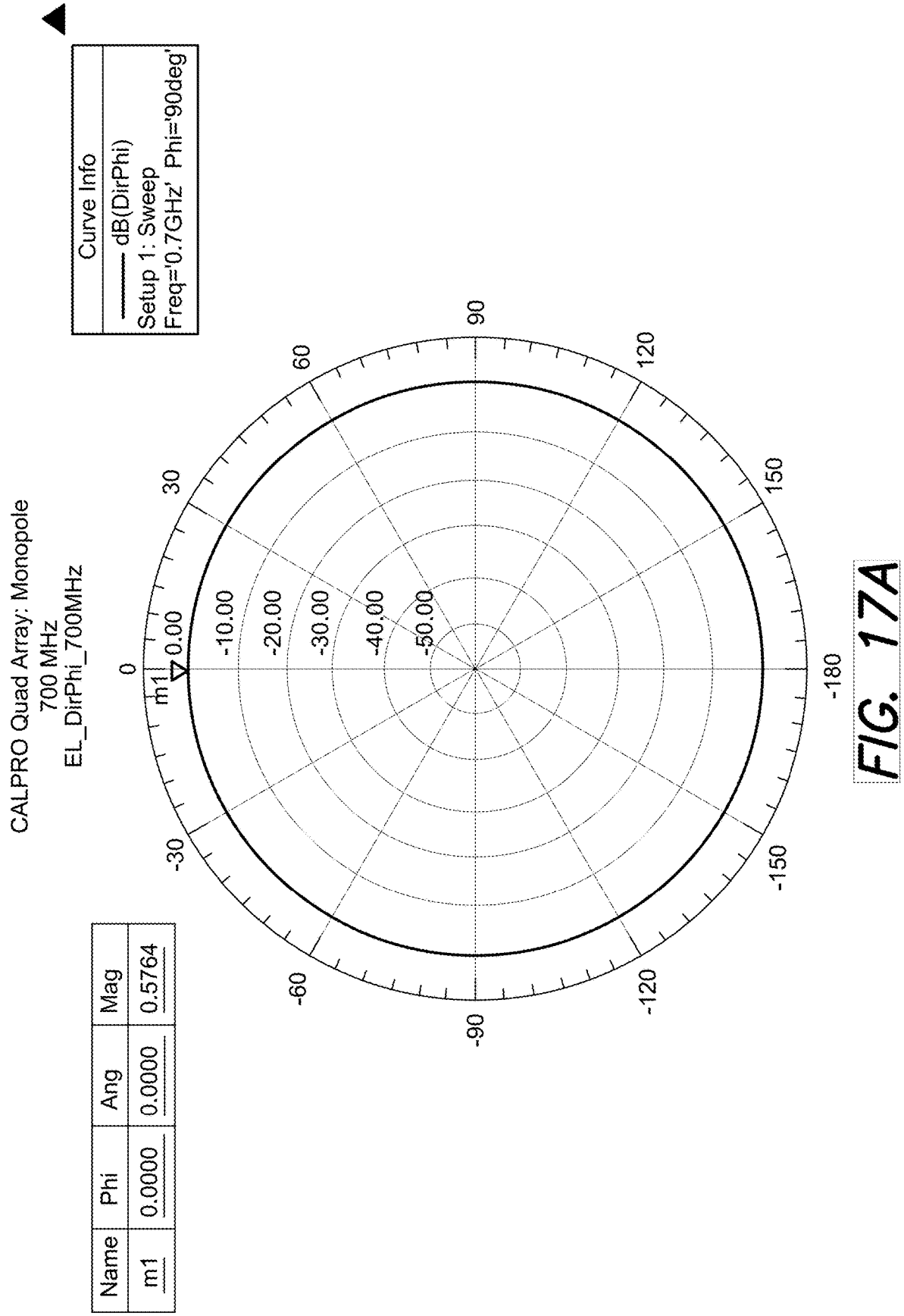
FIGS. 17A-17D show elevation patterns in the monopole mode.
Figure 17B:
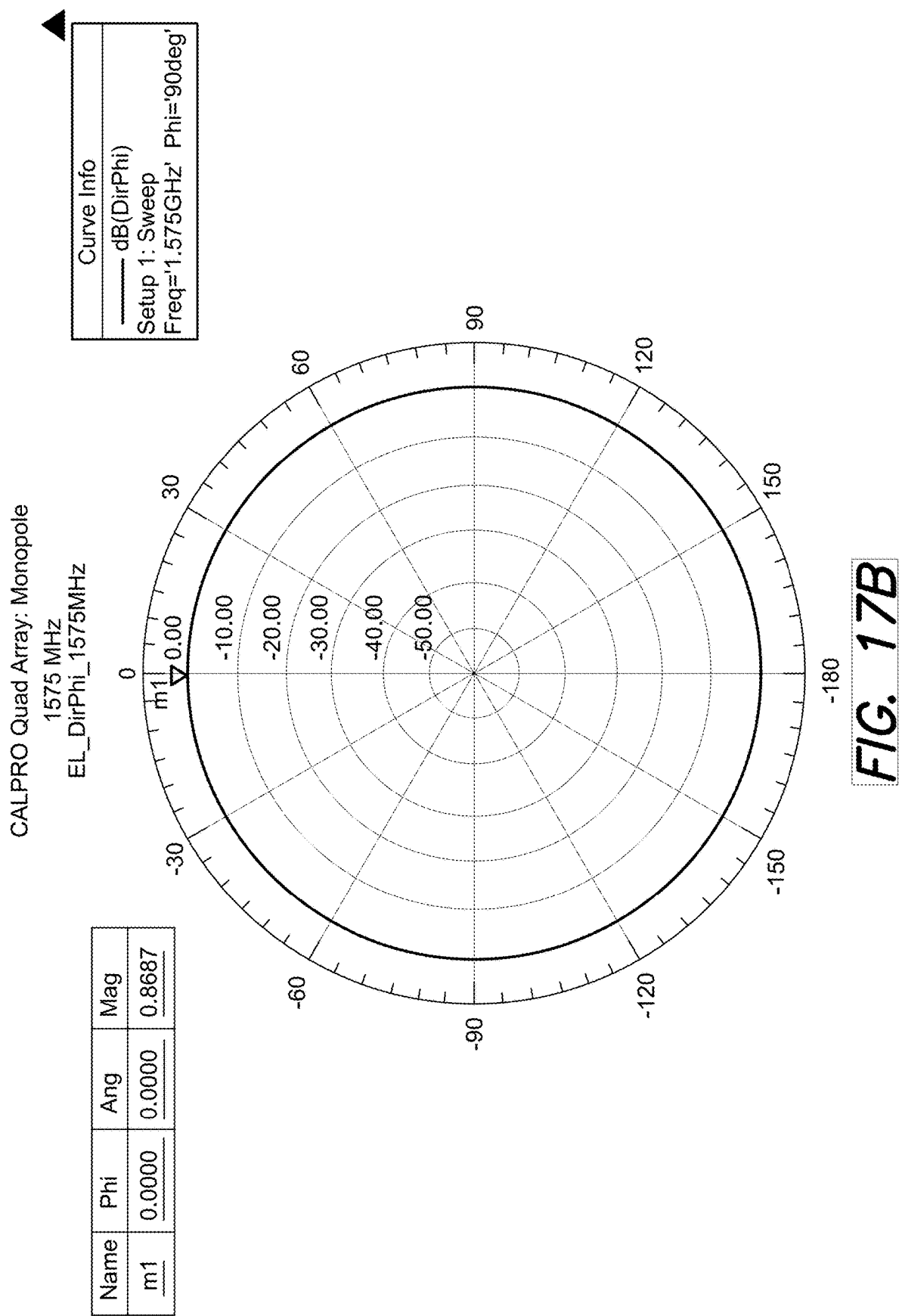
Figure 17C:
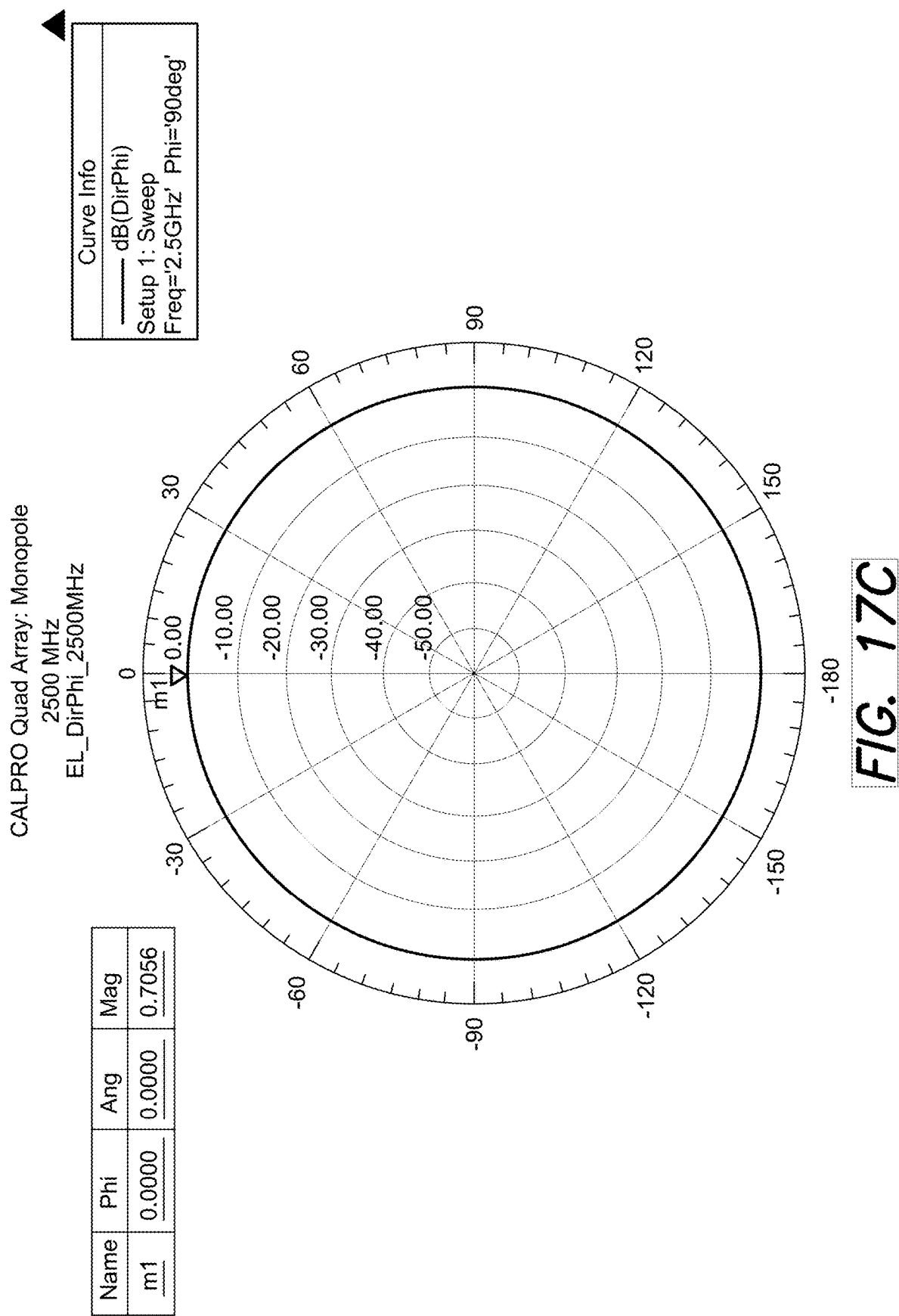
Figure 17D:
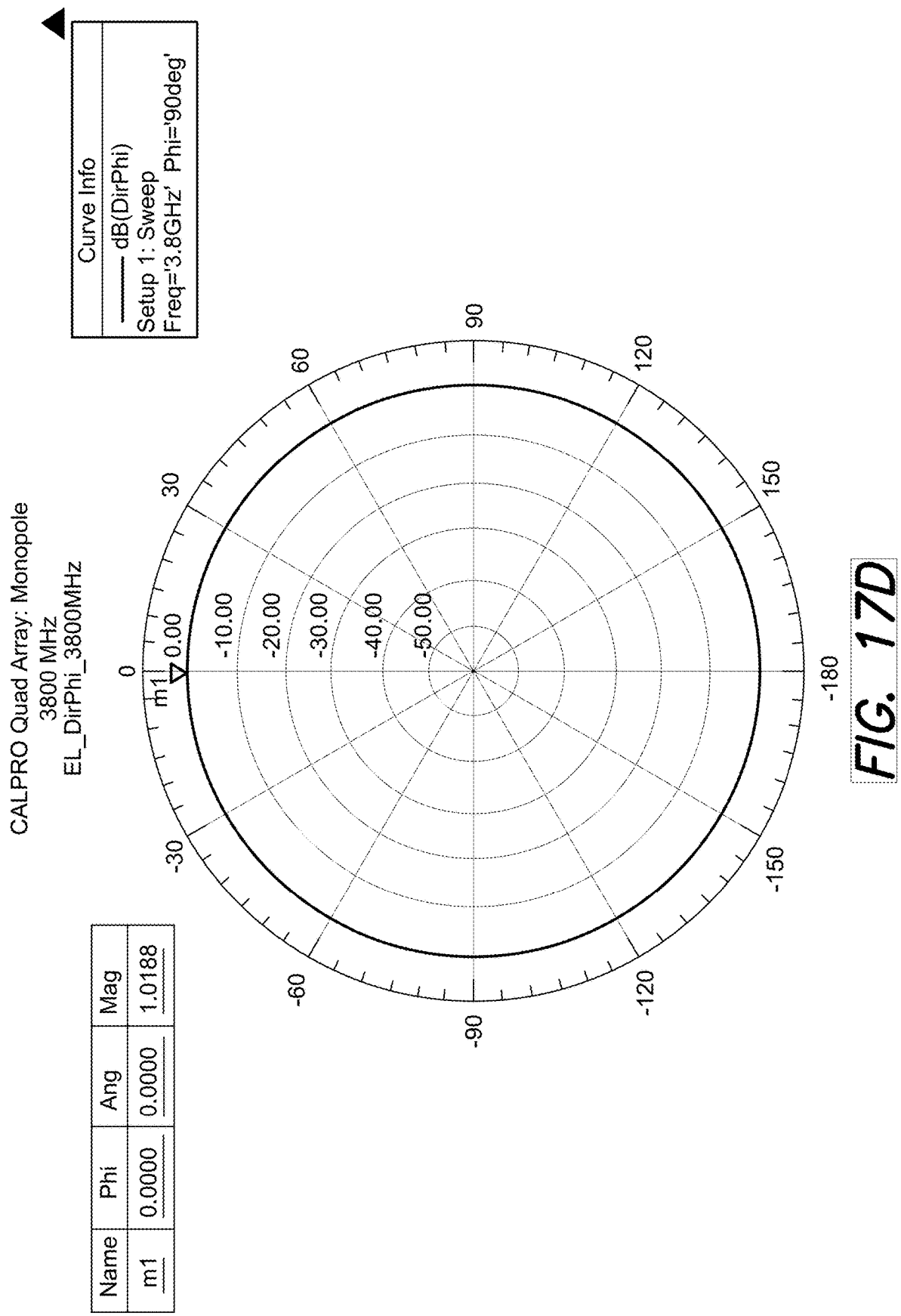
Figure 18A:
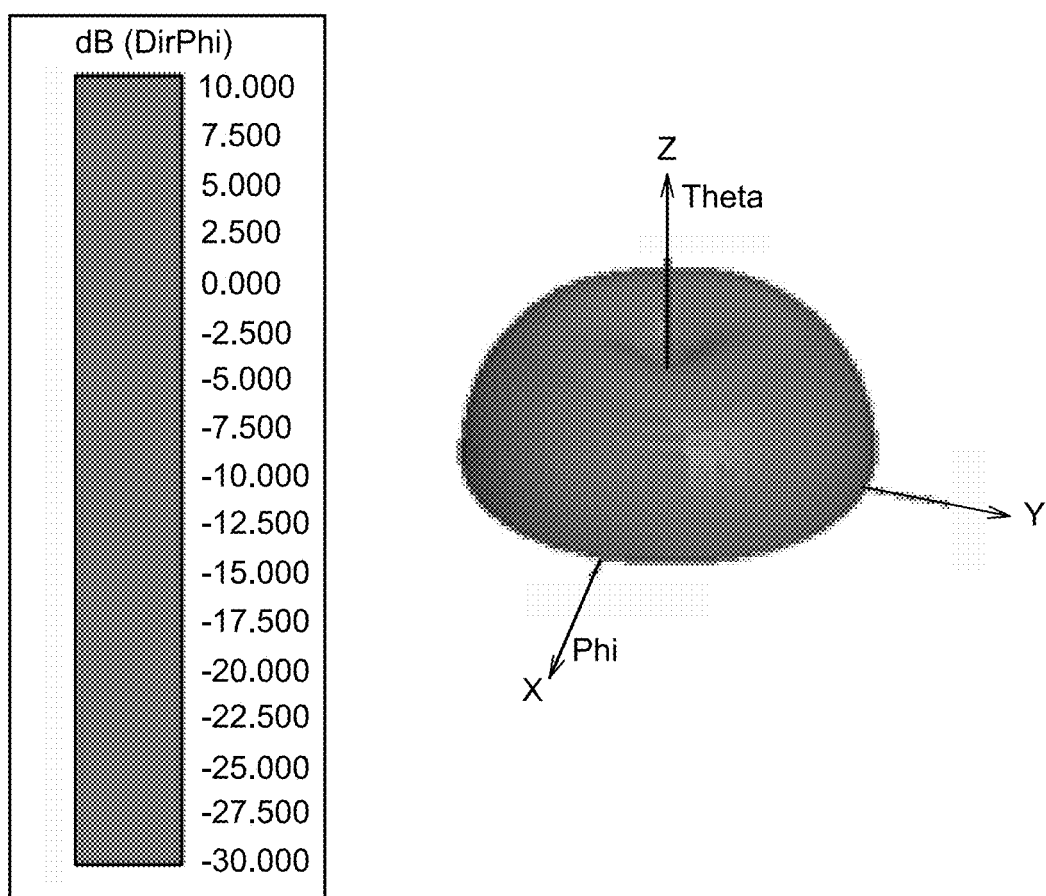
FIGS. 18A-18D show 3-D polar patterns in the monopole mode.
Figure 18B:
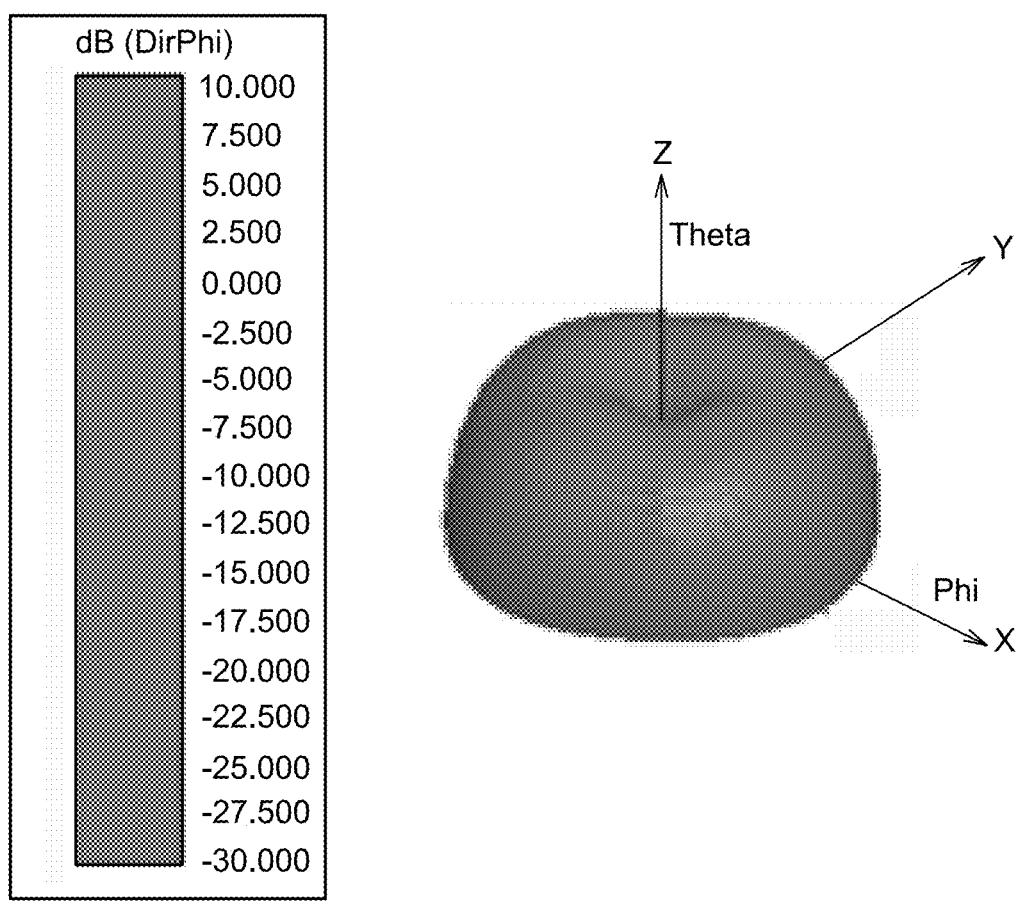
Figure 18C:
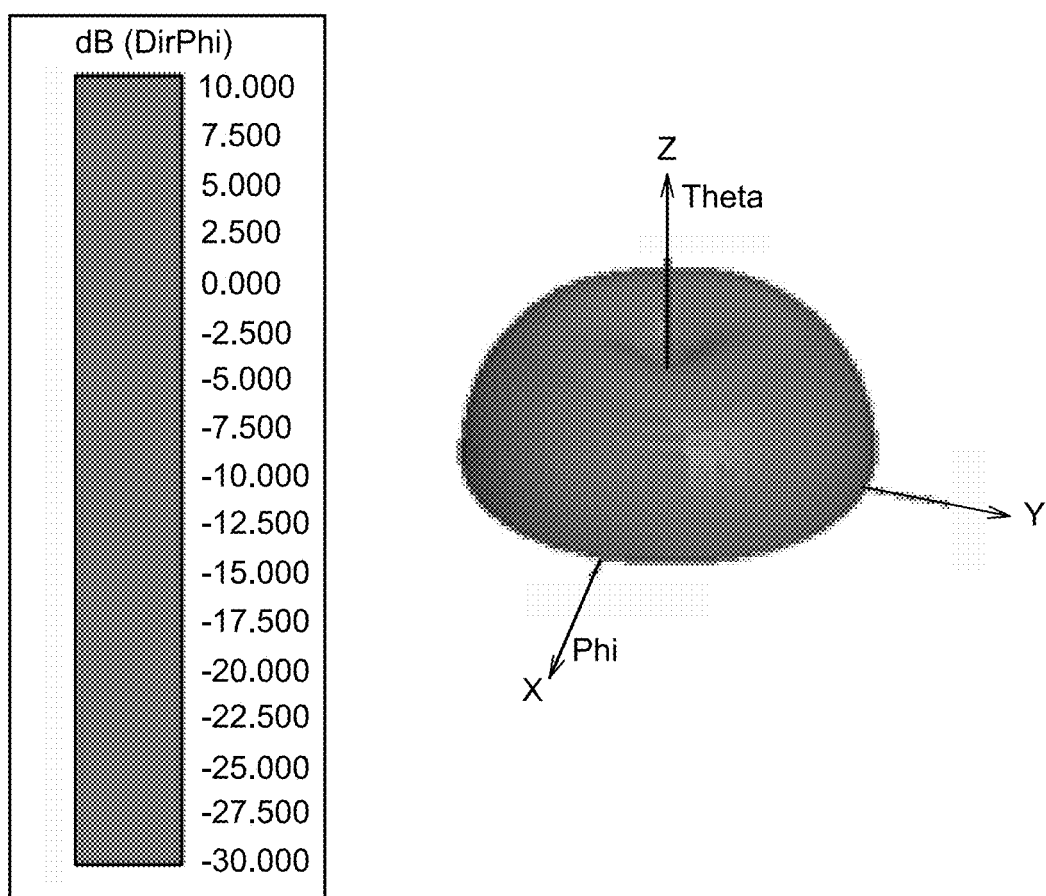
Figure 18D:
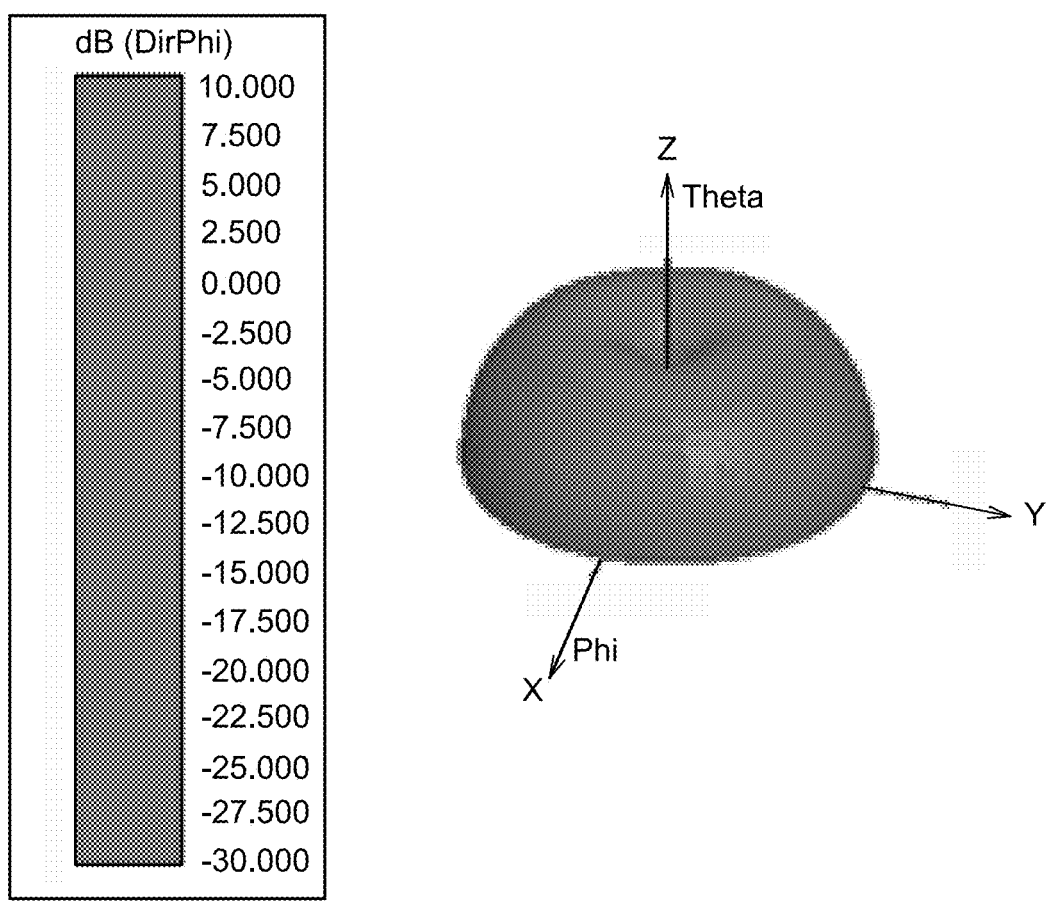
Figure 19A:
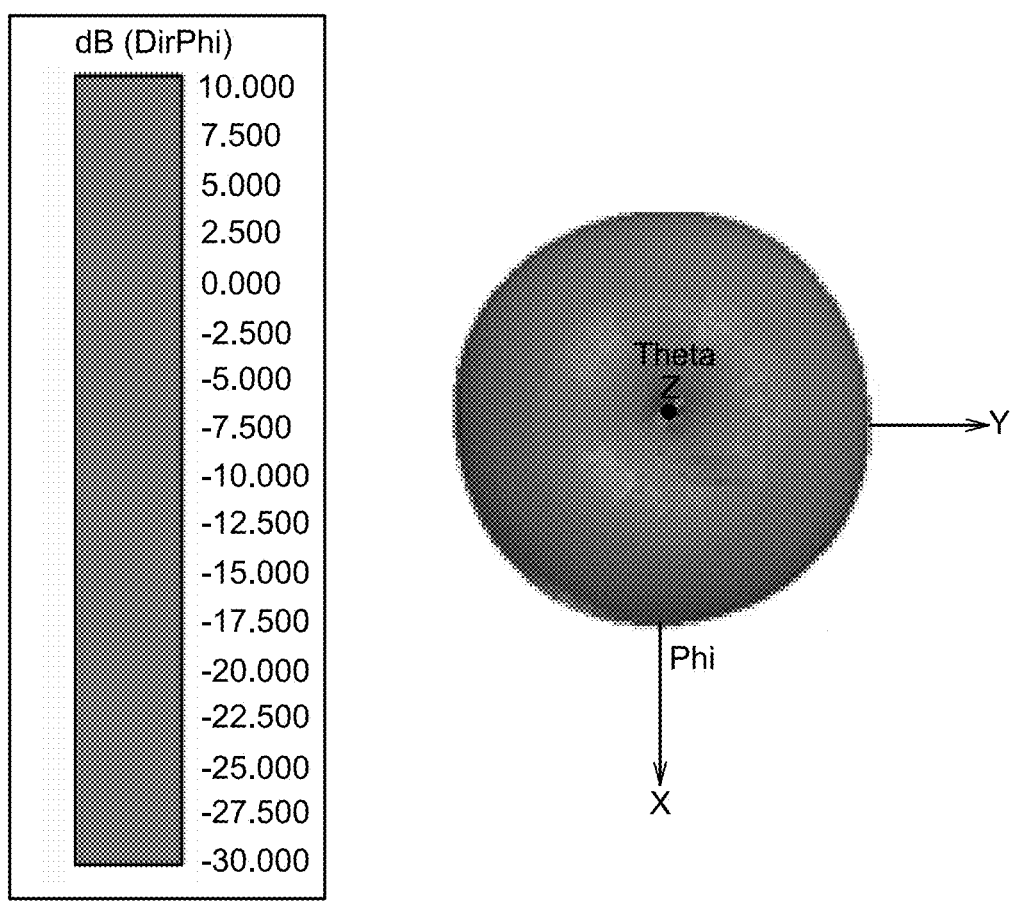
FIGS. 19A-19D show 3D polar patterns in the monopole operating mode.
Figure 19B:
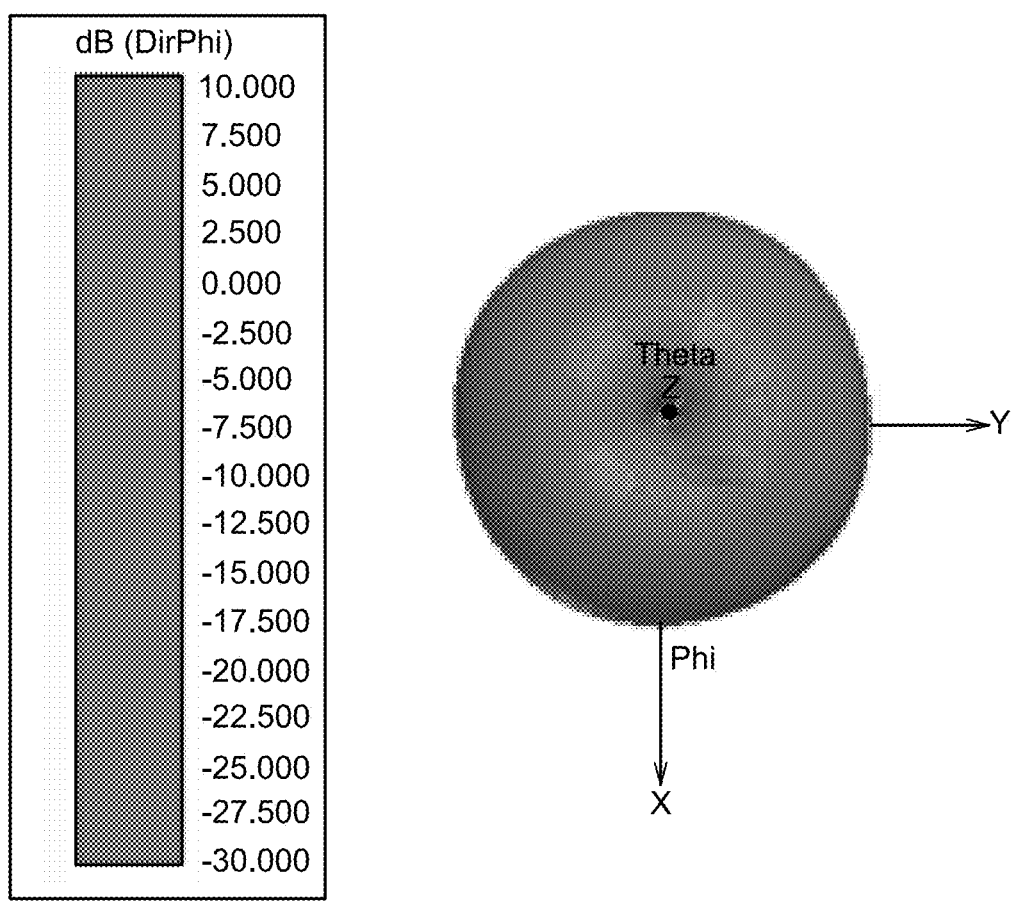
Figure 19C:
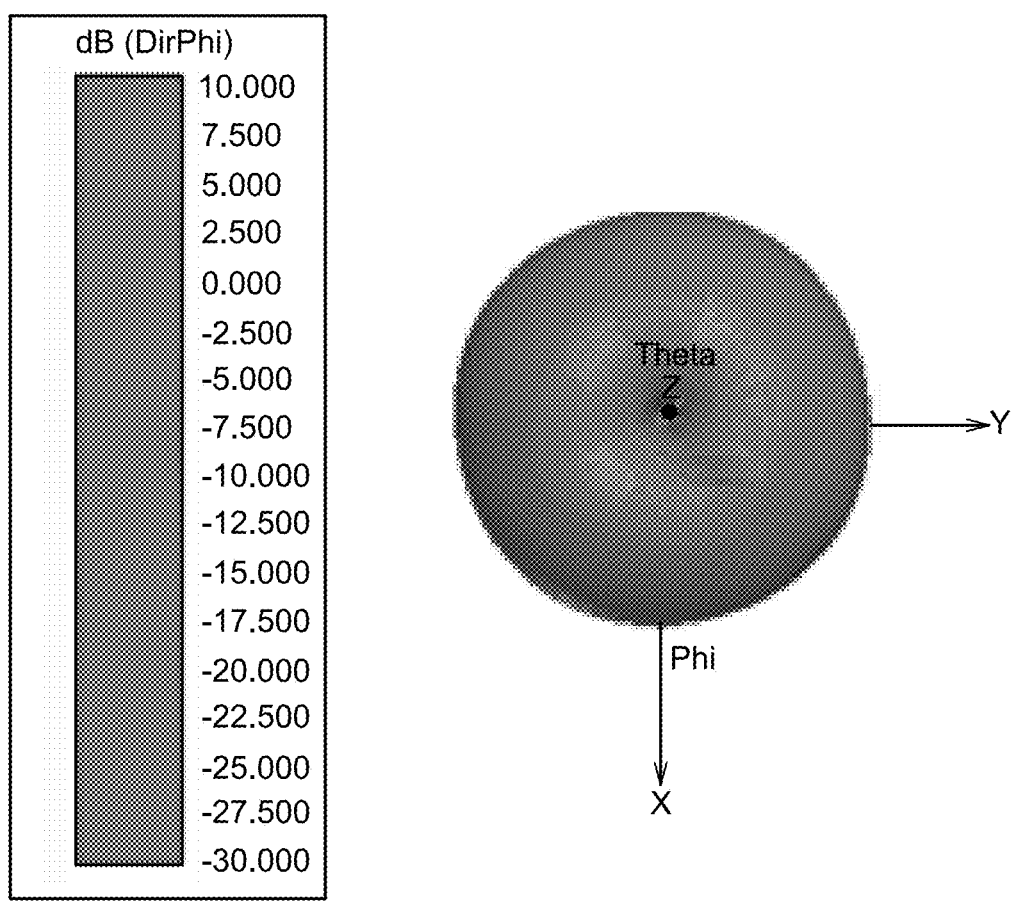
Figure 19D:
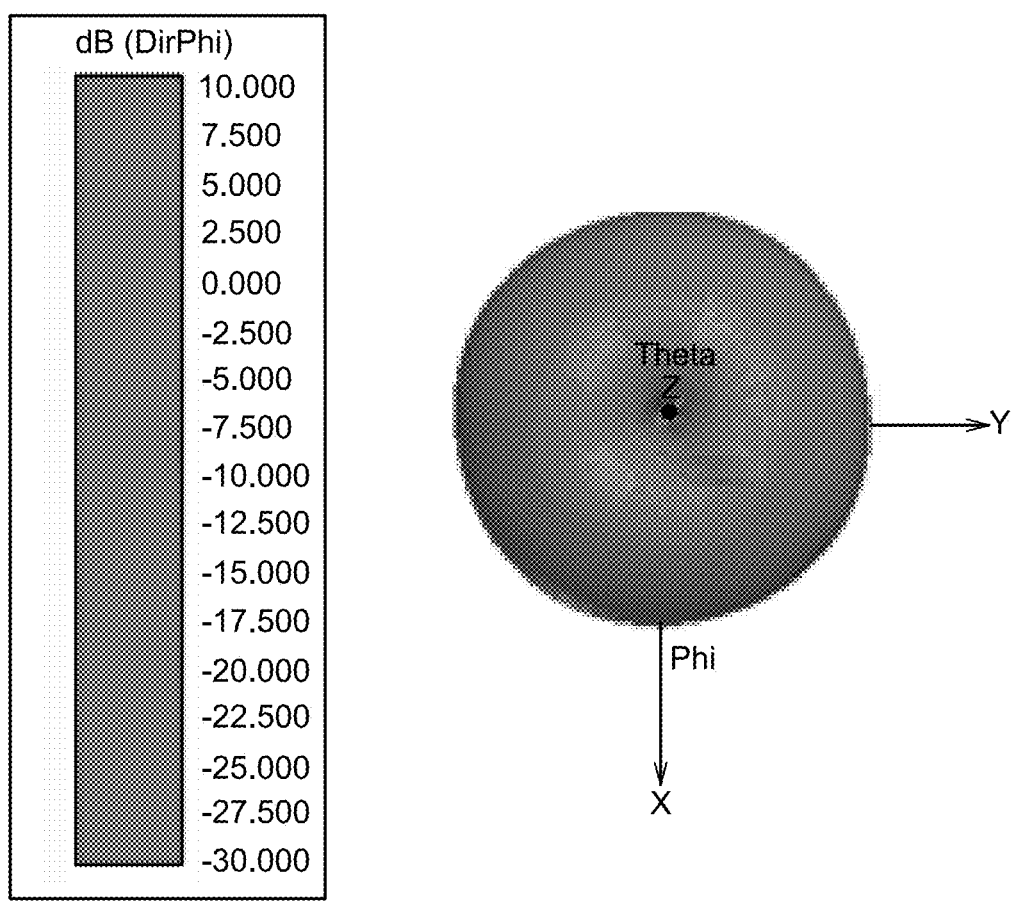
Figure 20A:
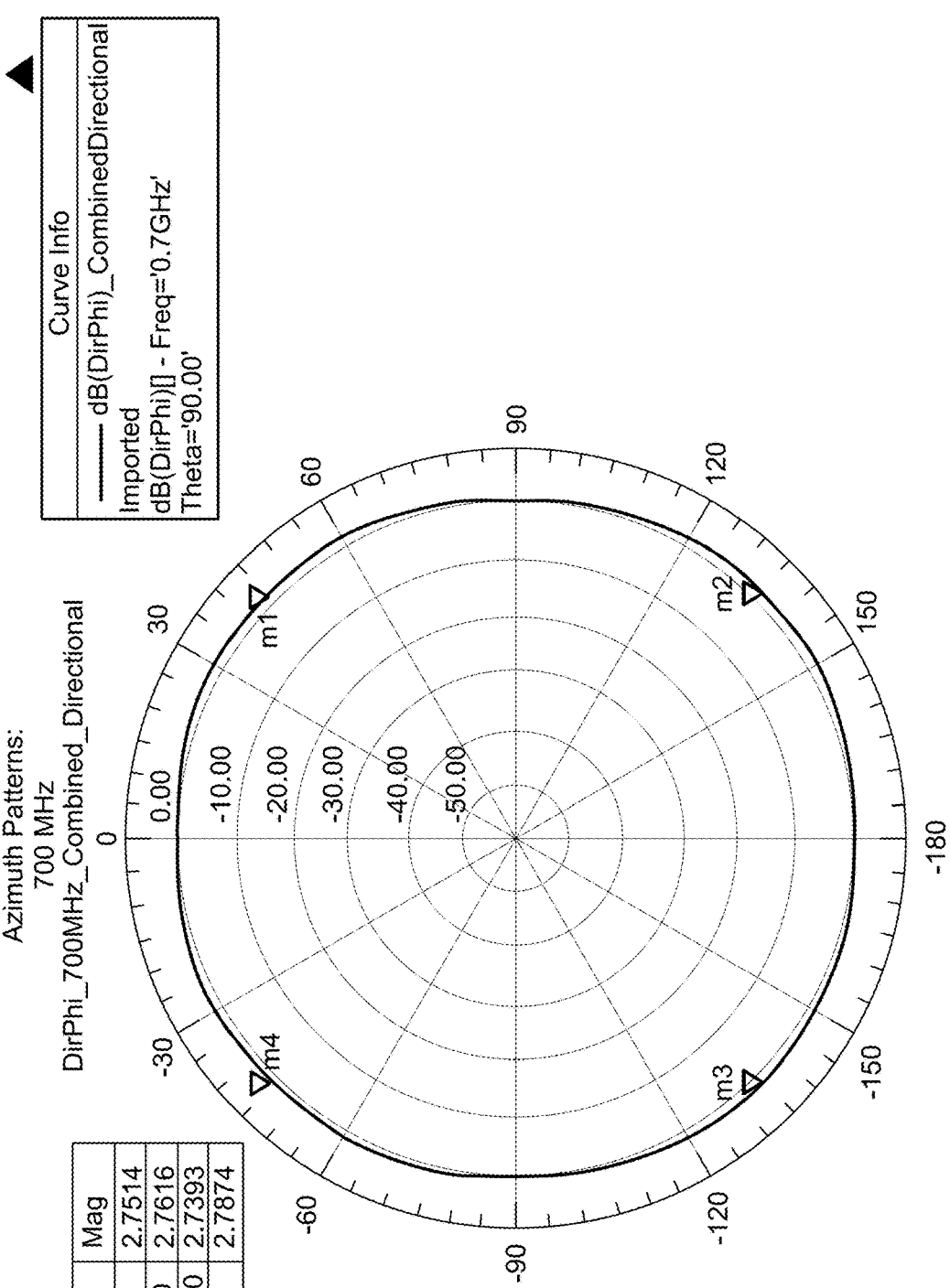
FIGS. 20A-20D show azimuth patterns in the quad directional combined mode.
Figure 20B:
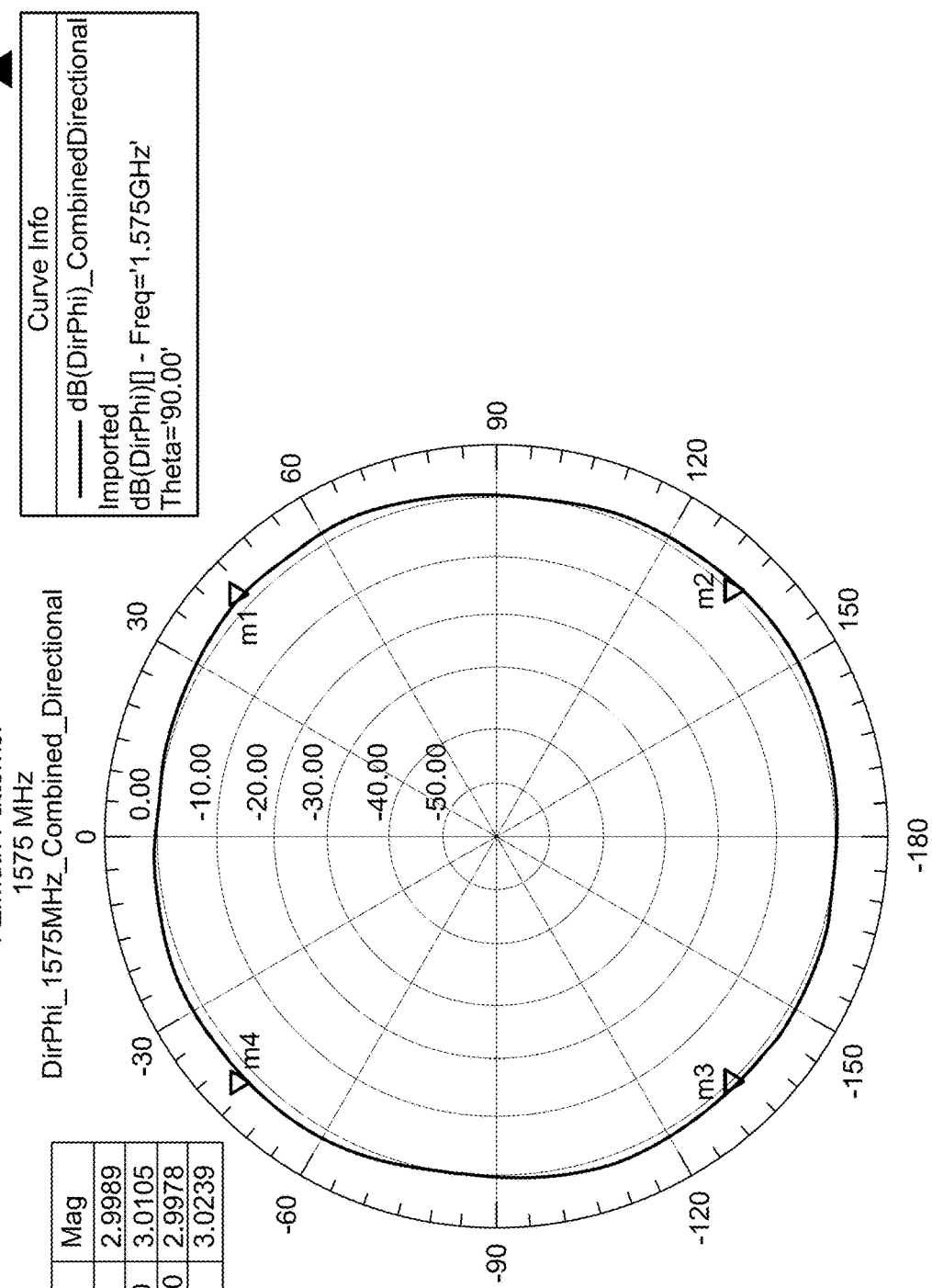
Figure 20C:
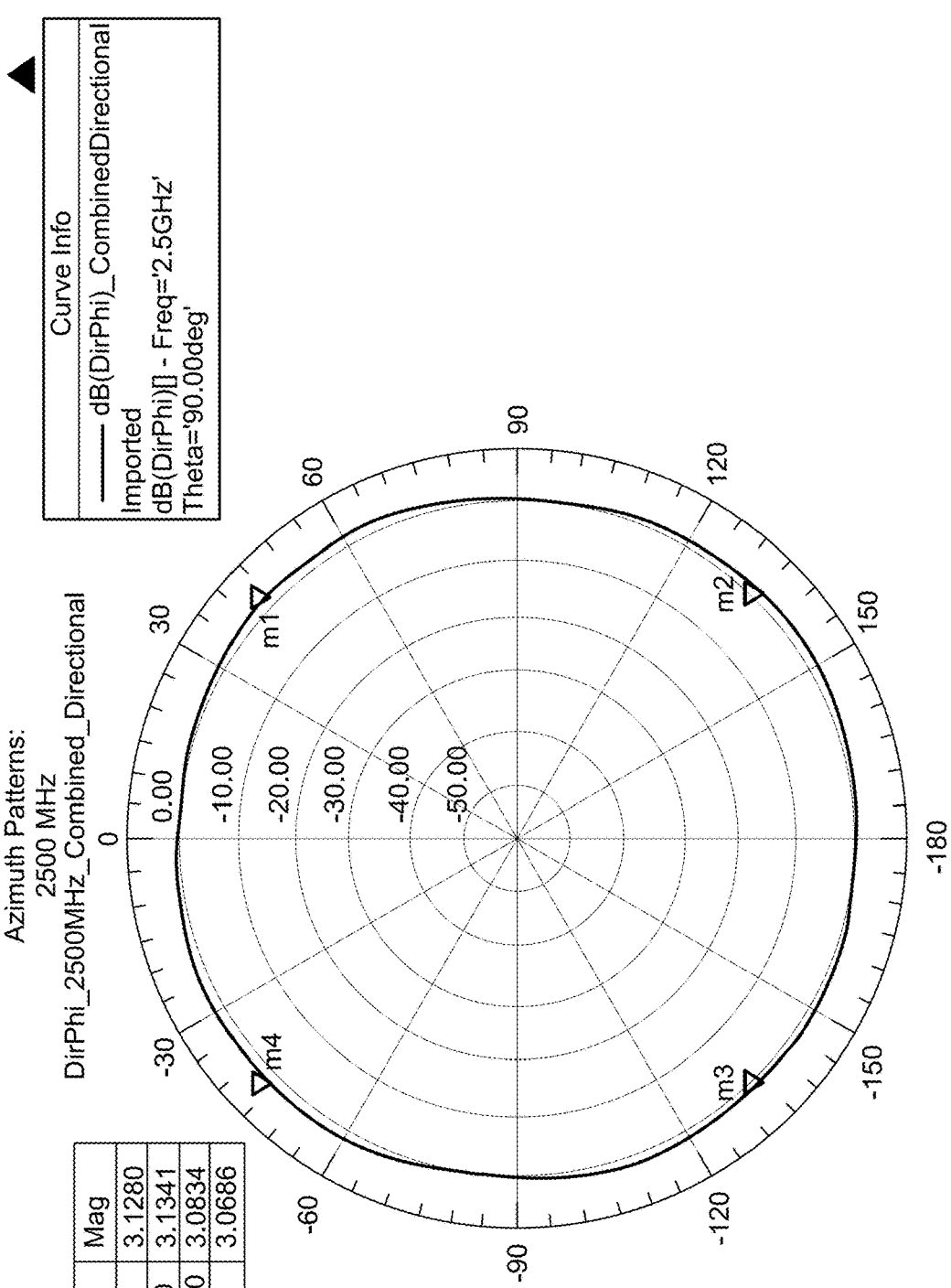
Figure 20D:
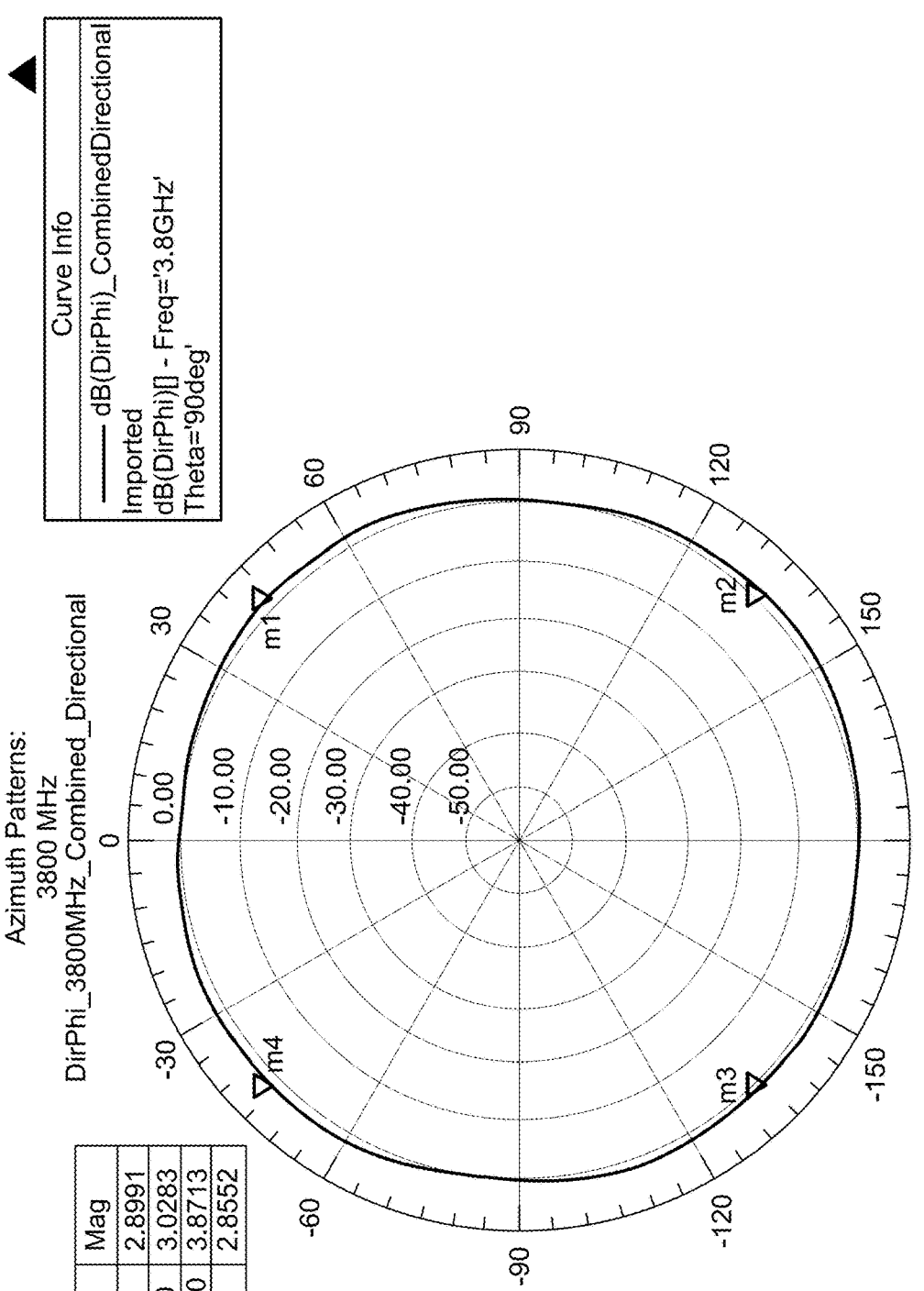
Figure 21A:
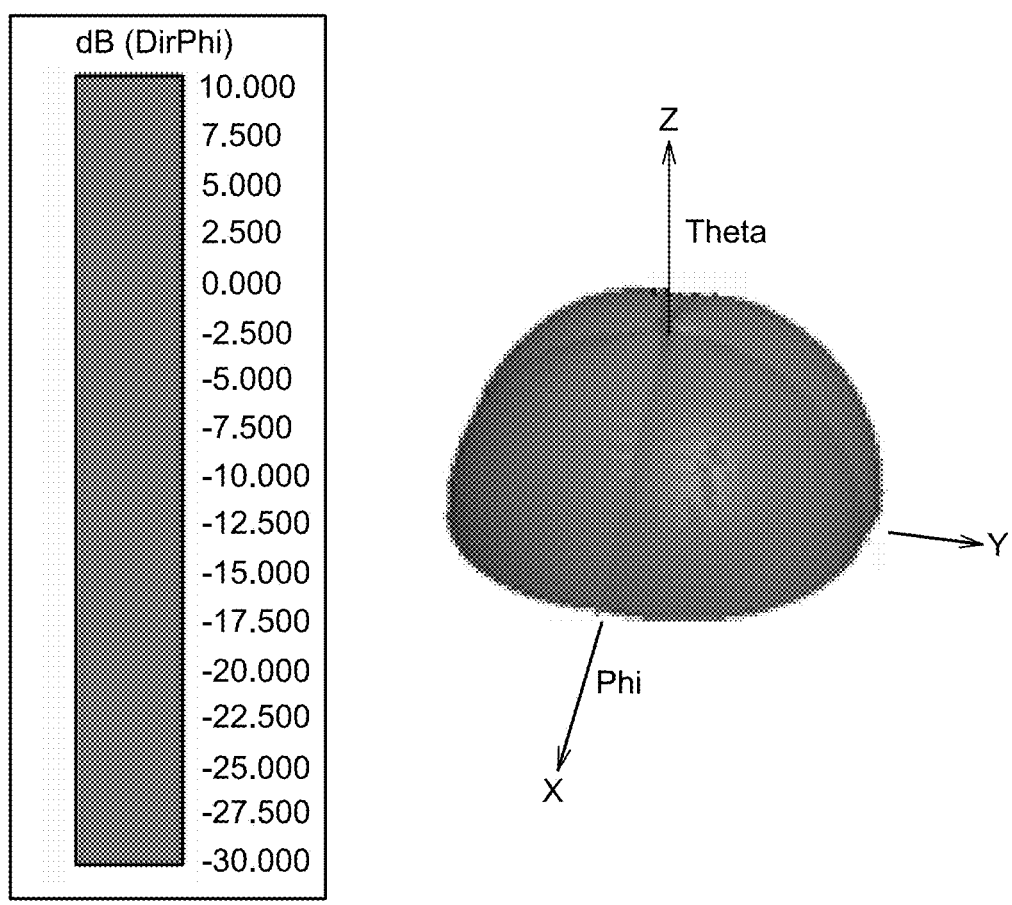
FIGS. 21A-21D show directional combined polar patterns.
Figure 21B:
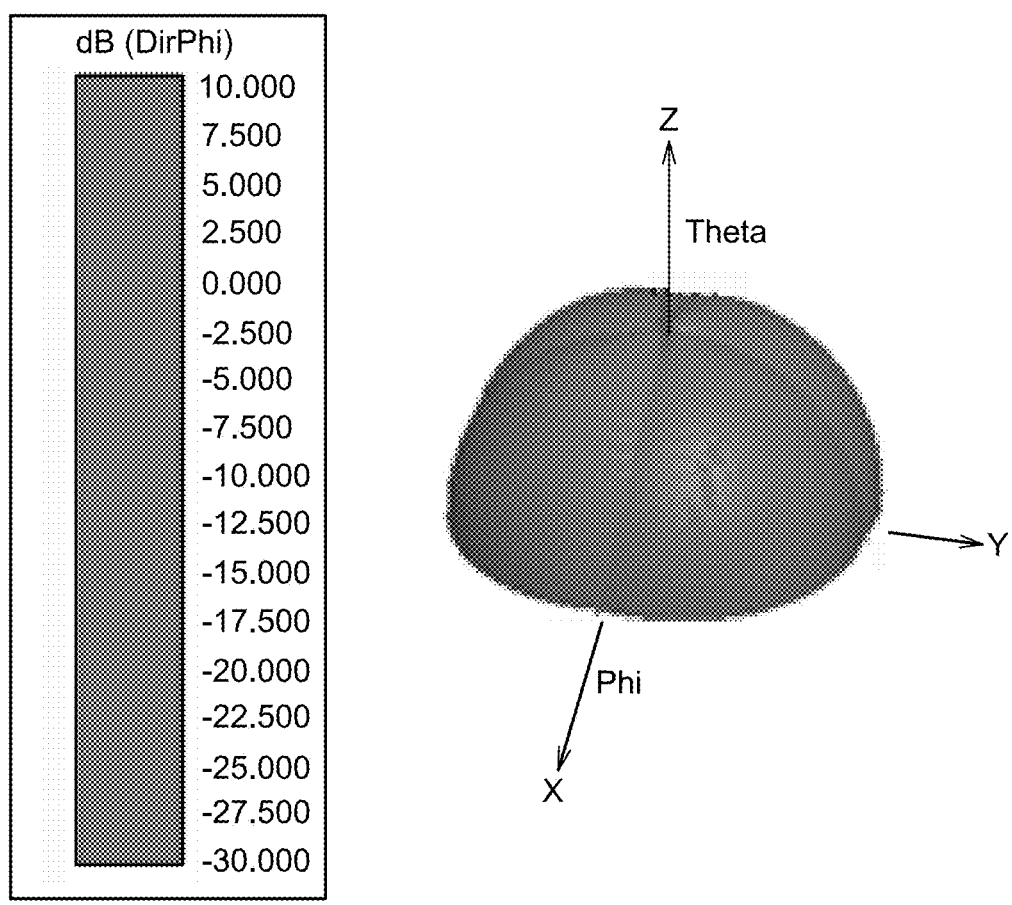
Figure 21C:
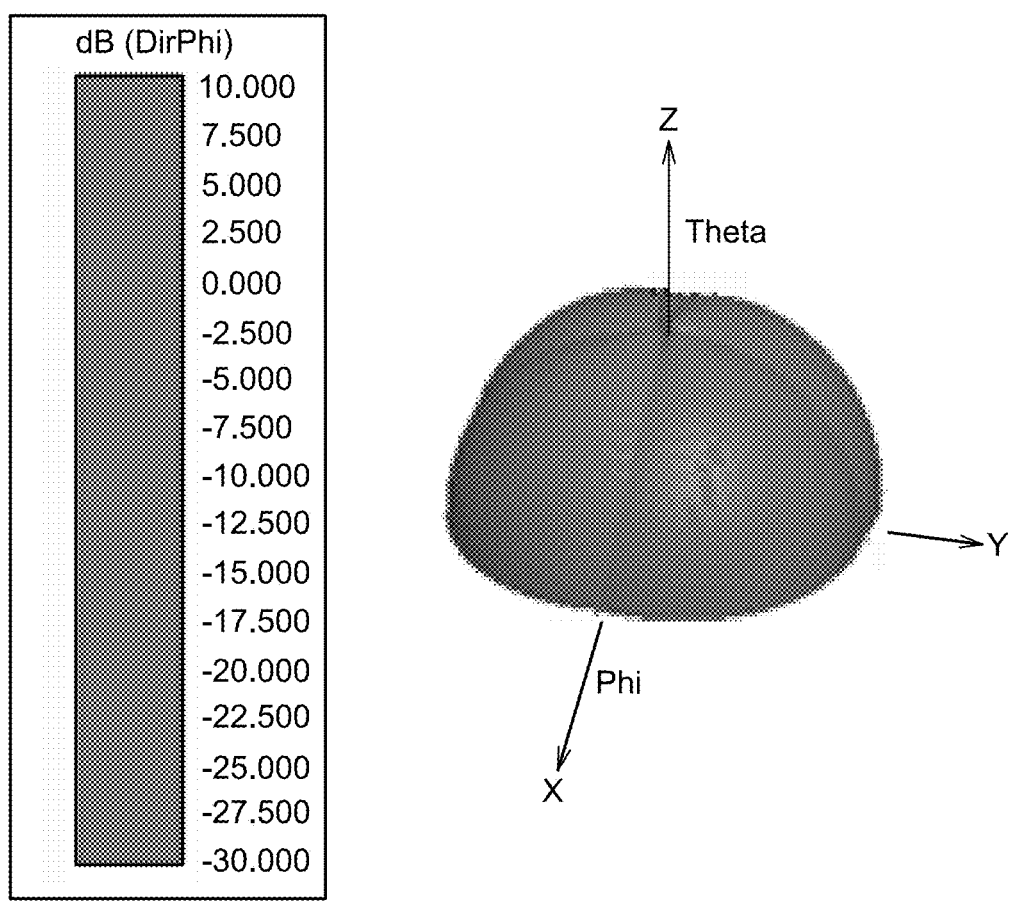
Figure 21D:
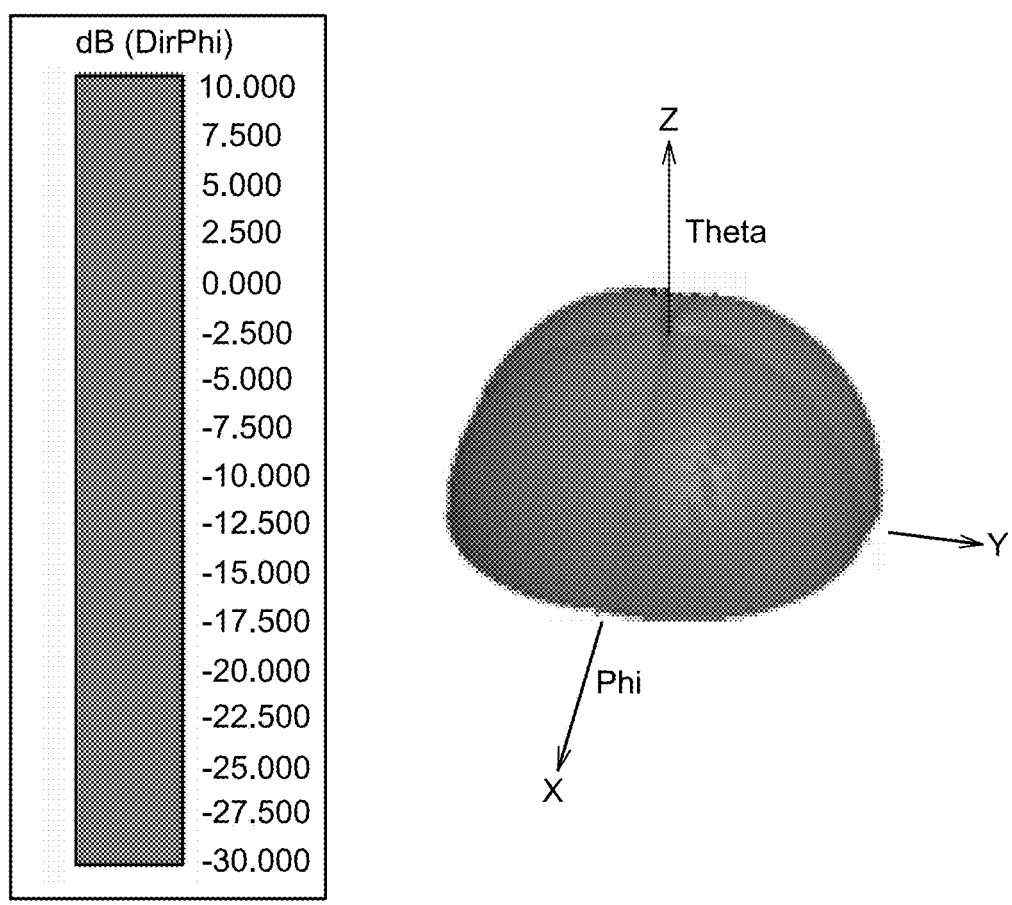
Figure 22A:
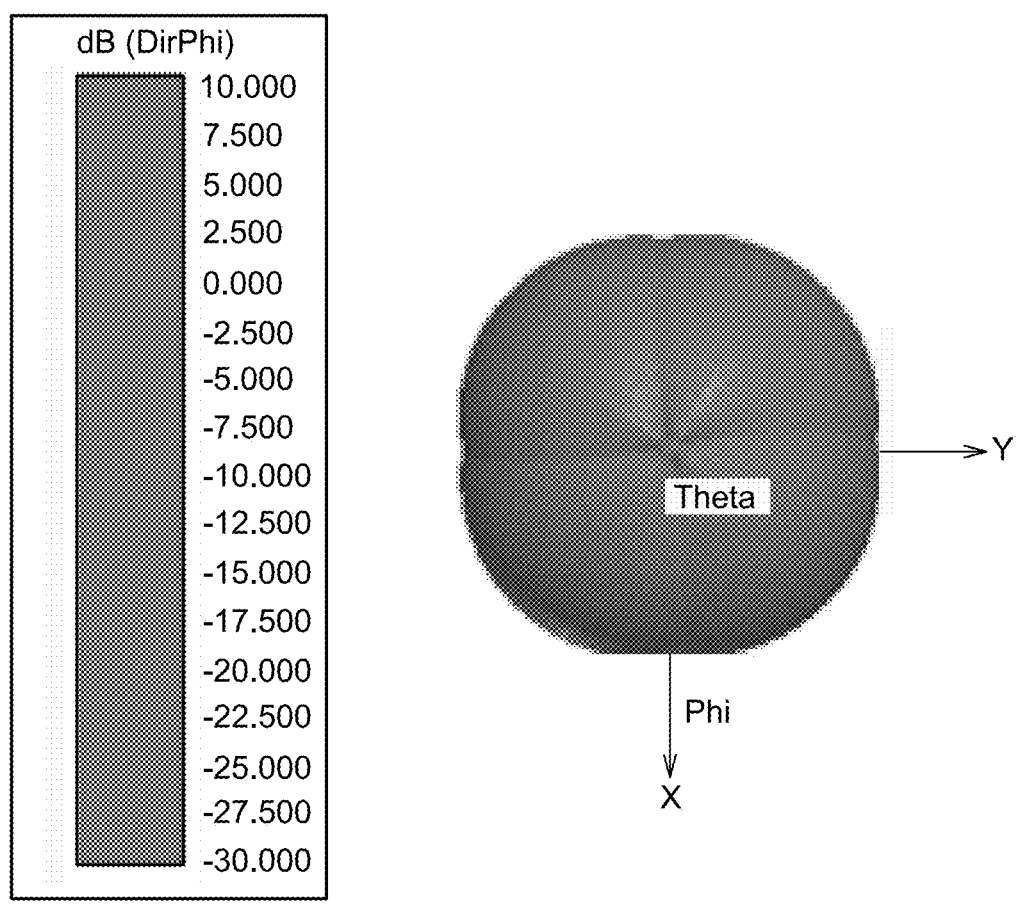
FIGS. 22A-22D so still further quite directional combined patterns
Figure 22B:
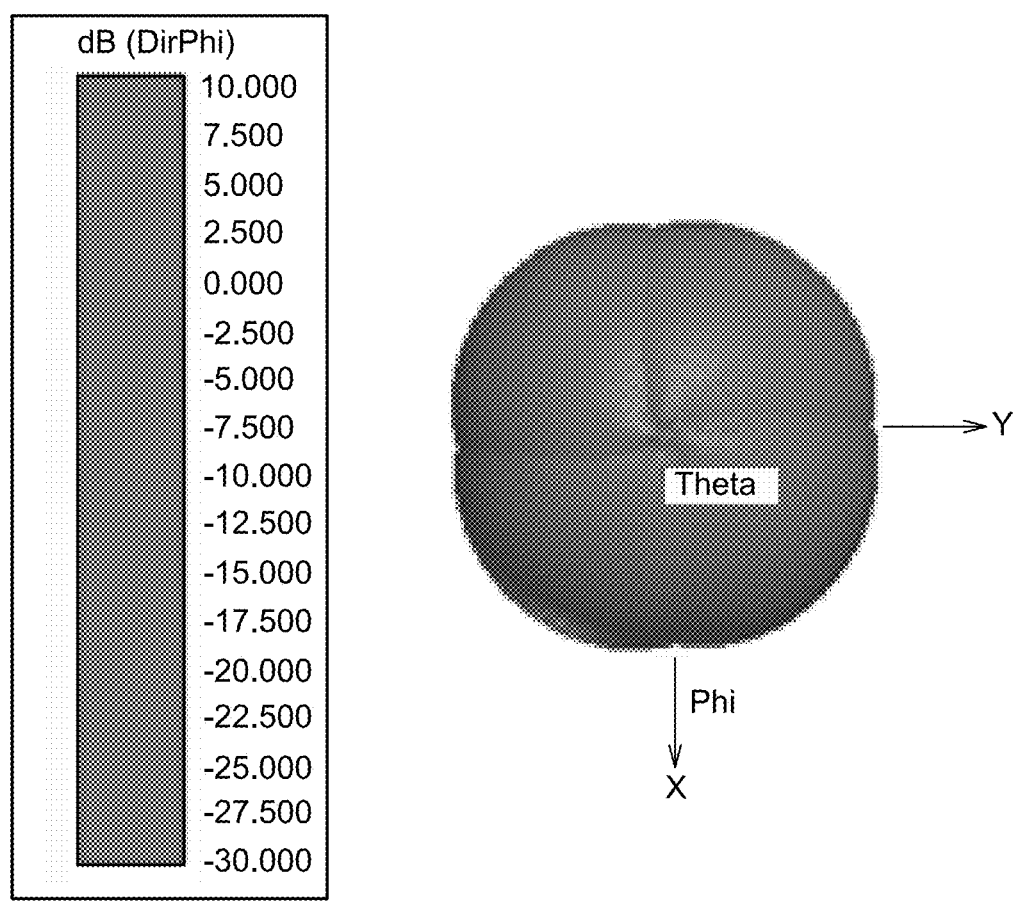
Figure 22C:
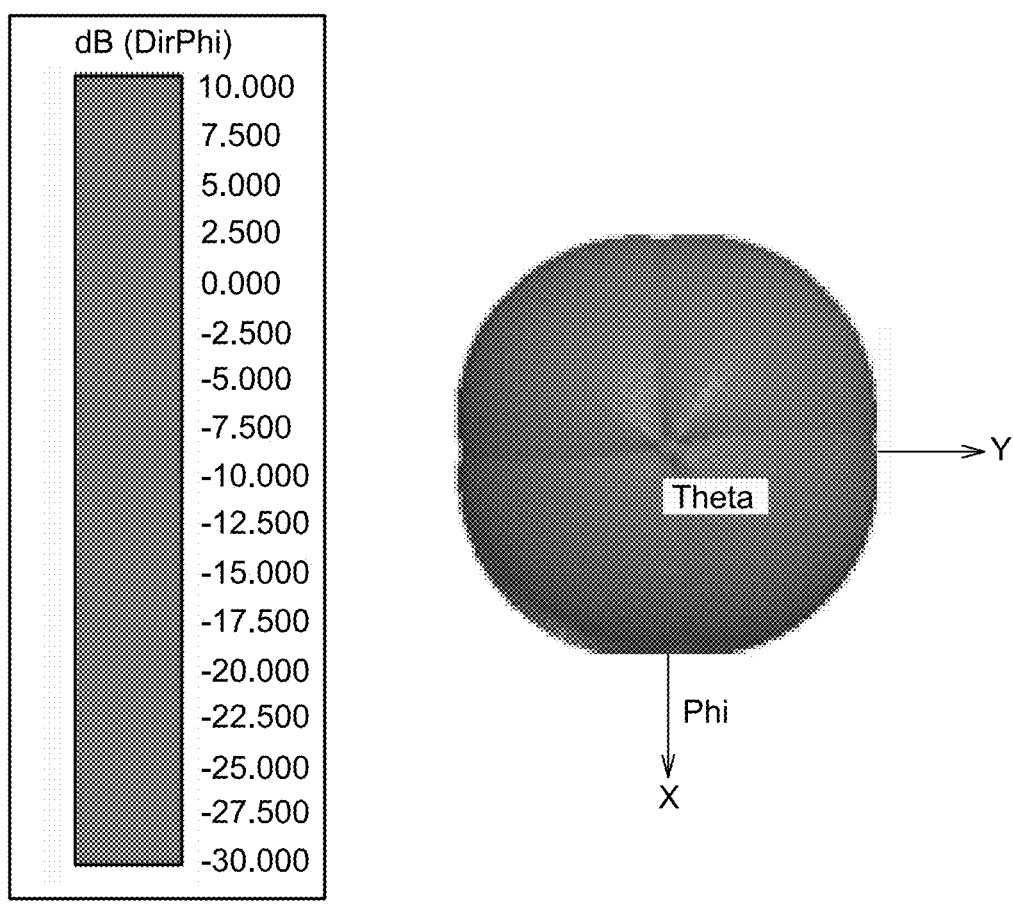
Figure 22D:
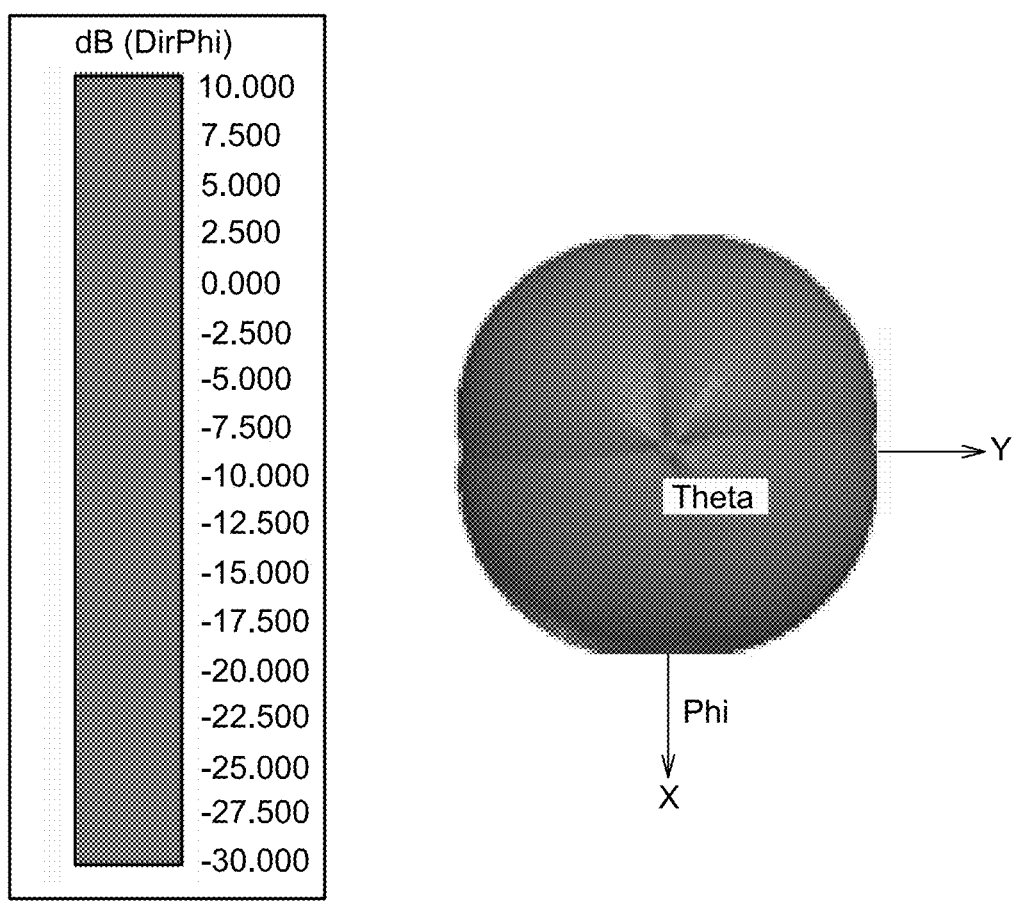

FIG. 14 illustrates gain in the monopole mode and FIG. 15 illustrates gain in the directional mode.

FIGS. 16A, 16B, 16C and 16D show elevation patterns at four frequencies (700, 1575, 2500 and 3800 MHz) in the monopole operating mode. FIGS. 17A, 17B, 17C and 17D are the azimith patterns at the same frequencies.

FIGS. 18A, 18B, 18C, and 18D and FIGS. 19A, 19B, 19C and 19D show 3-D polar patterns in the same configuration; note the generally hemispherical coverage area that is possible.

FIGS. 20A-20D, 21A-21D and 22A-22D are similar plots for the azimuth and 3D polar for operation in the directional mode.

Figure 23:
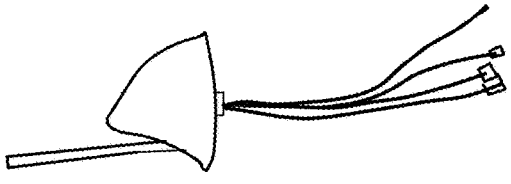
FIG. 23 compares the performance of a comparable shark fin antenna.

FIG. 23 compares typical performance of a common "shark fin" type antenna and its expected peak gain values for 3G, LTE and Wi-Fi operation.

Figure 24:
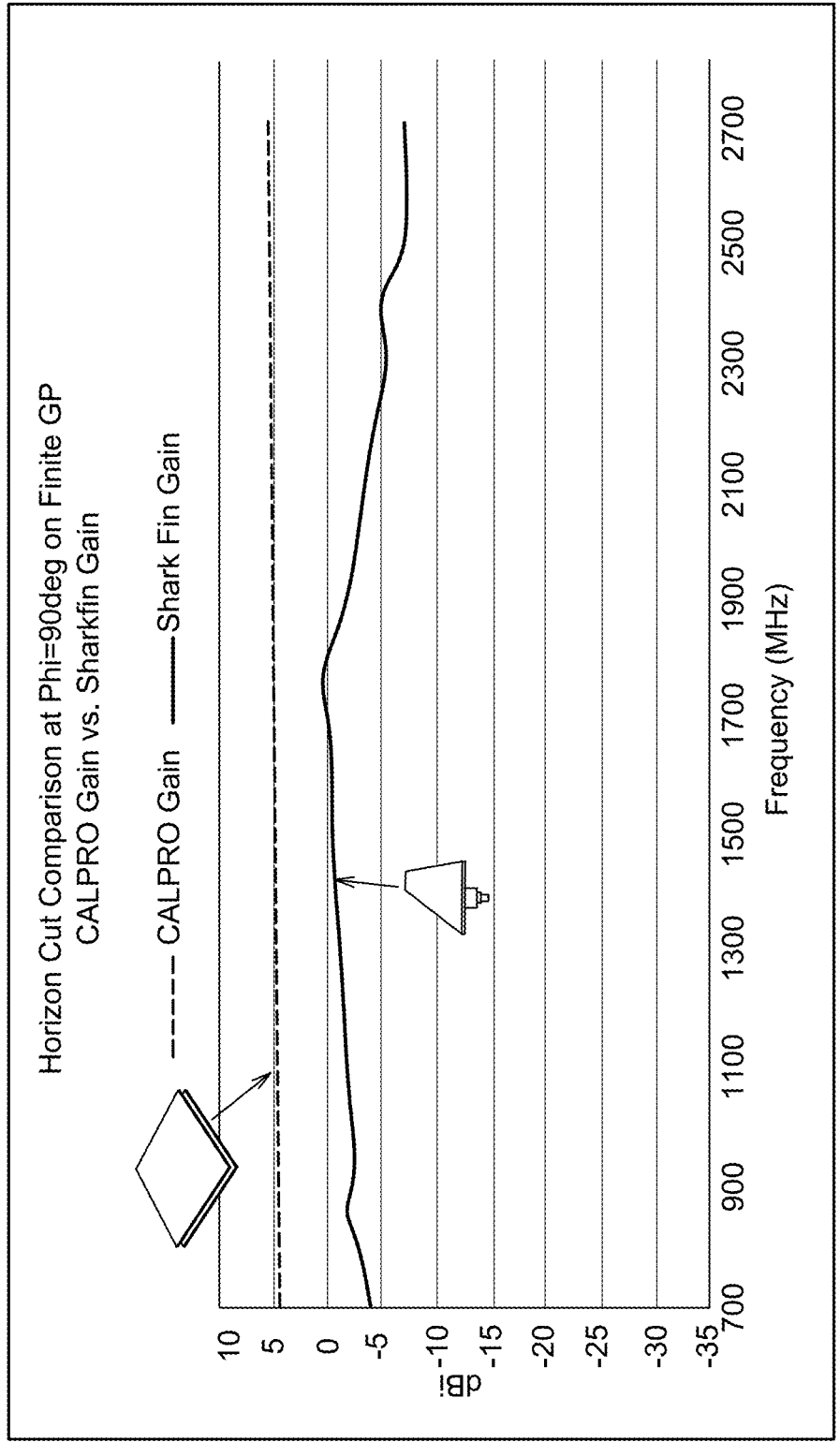
FIG. 24 compares the horizontal gain available with the low profile orientation-independent array described herein and shark fin antenna.

FIG. 24 illustrates the performance improvement possible with the antenna structure described herein as compared to the typical shark fin.

FIG. 25 is a chart of advantages of the antenna versus other quad slot arrays.

In summary, several benefits are brought about by the use of the directional antennas described herein. These include directional reception at cellular, 3G, 4G, and other frequencies. An approximate 10 to 16 dB increase in signal to noise ratio can be expected as compared to conventional antennas. The result can provide faster data connections with fewer dead zones. An increased ability to detect signals at WiFi and satellite radio frequencies also provides an expected boost in reception quality. Similarly, AM/FM operation should improve, with the ability to receive signals from more stations at greater distances with less noise.

We have described a conformal antenna having a low profile that consists of fournested orientation-independent array subassemblies. The structure can respond to right-hand circulay polarized and left-hand circulay polarized beams simultaneously, providing separate I/O ports for each polarization. Diversity can be provided with simultaneous bidirectional orthogonal sine and cosine beams created by subtracting the diagonally opposite radiators.

Alternate Implementation

In one specific implementation, the antenna arrays described herein are a low profile, conformal, wide bandwidth, super-directive orientation independent antenna array with one or more controlled ground plane elements. In one implementation shown in FIG. 26, the orientation independent directional antenna array 160 is adapted for use in a vehicle such as a passenger vehicle. The antenna array 160 consists of a number of subarrays 1600-1, 1600-2, 1600-3, 1600-4. Each subarray 1600 includes a number of generally cylindrical, volumetric, radiating elements 1605 with a center driven element surrounded by two or more parasitic elements. The parasitic elements may be arranged in a circle about the center element over or adjacent a main ground plane 1601. The parasitic elements may each be controlled, such as under software, to provide different polarizations and/or relatively low directivity beamforming.

Each of the individual cylindrical elements 1605 may be a cylinder, or a structure with multiple flat sides that approximates a cylinder. Elements 1605 include a set of quadrant sections that provide a pair of crossed dipoles. The feeds for each crossed dipole may then be in turn fed to beamforming circuits. In one implementation, a dipole element consists of a triangular or pie-shaped patch on the top of the cylinder, the side of the cylinder, and/or a pie-shaped patch on the bottom. It is understood that the elements 1605 may be a single patch of conductive material or may be two patches interconnected with meander lines and/or capacitances.

Figure 26:
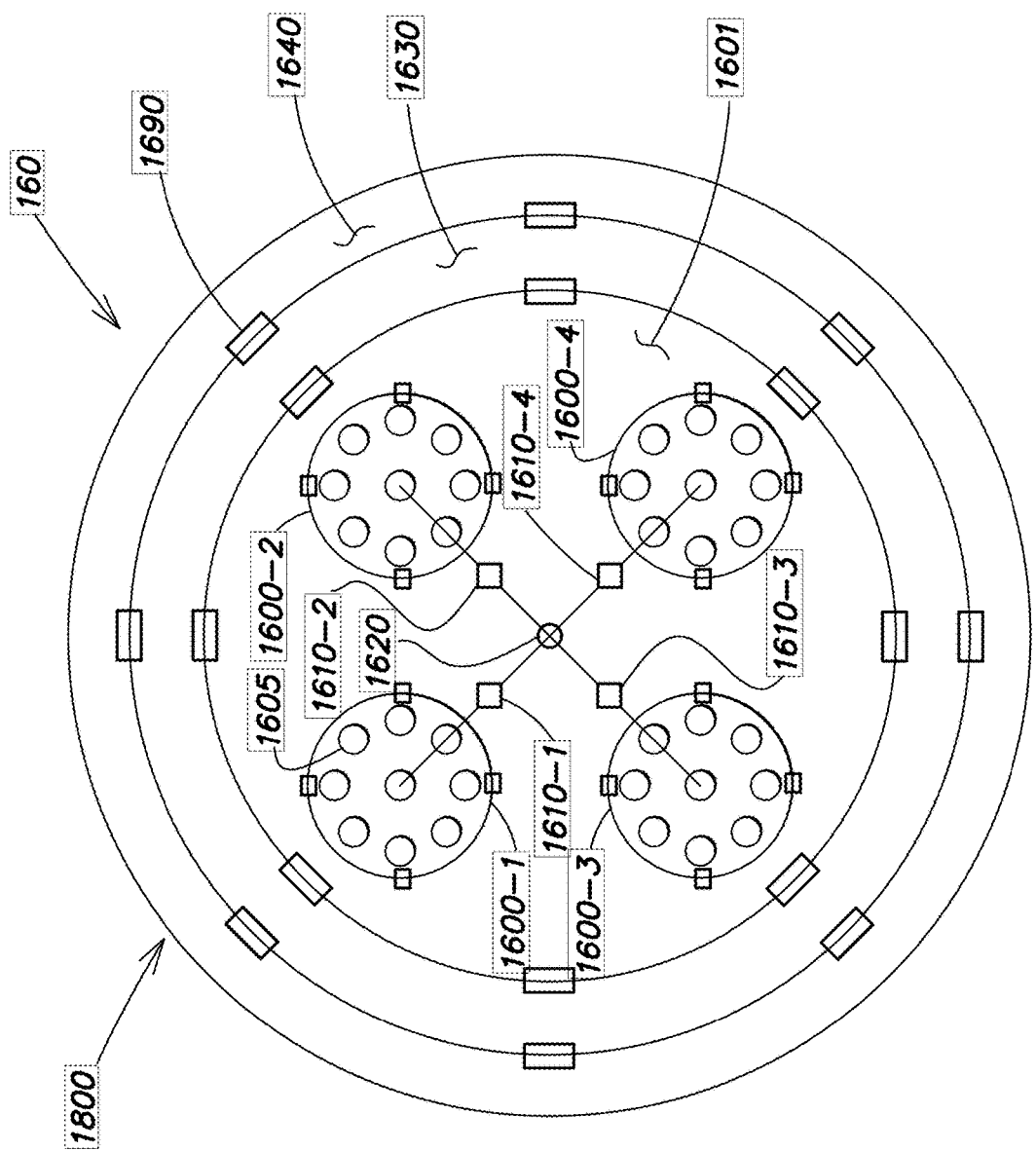
FIG. 26 illustrates another implementation of a conformal antenna.

As shown in FIG. 26, the center elements from each of the subarrays 1600-1, 1600-2, 1600-3, 1600-4 are connected to a common feed 1620 through respective delays 1610-1, 1610-2, 1610-3, and 1610-4. The delays 1610 may also be software controlled (such as by microprocessor-based or hardwired logic controller, not shown) to provide relatively higher directivity beamforming of the entire array 160. Configurations for this type of cylindrical, Orientation Independent steerable antenna array, and possible polarization and beamforming circuits, are described in further detail in issued U.S. Pat. Nos. 9,118,116 and 8,988,303, and co-pending U.S. patent application Ser. No. 15/362,988 filed Nov. 29, 2016, and U.S. patent application Ser. No. 62/432,973 filed Dec. 12, 2016, all of which are hereby incorporated by reference.

The array 160 may be further placed in the middle of a controllable or tuned ground plane structure 1800 formed from one or more adjacent conductive surfaces 1630, 1640 that surround main ground plane 1601. The tuned ground plane 1800 offers a uniform omnidirectional reflecting surface to maintain stable antenna patterns. If the array 160 were to be mounted in the center of a metal vehicle roof without the tuned ground plane 1800, the discontinuities of the roof edges might otherwise distort the resulting antenna patterns.

More particularly, one or more torroidal conductive surfaces 1630, 1640 surround the array 160 and act as switchable ground plane elements. Passively reconfigurable surface impedances 1690 are operate as a frequency dependent couplings between portions of the central array 160, such as ground plane 1601 and the surrounding ground plane element(s) 1630, 1640. The surrounding ground plane elements 1630, 1640 may be further connected to cavity walls with the passively reconfigurable couplings (shown in FIG. 27).

The center radiating array 160 is decoupled from the controllable ground plane 1800 for operation at a relatively high radiation frequency of interest, through the use of the passive frequency-dependent couplings 1690. The surrounding ground plane elements, 1630, 1640 being coupled to the central array in a frequency-dependent fashion, thus only become coupled and active as the frequency decreases. As the radiating frequency decreases, the active ground plane surface gradually expands to eventually encompass surfaces 1601, 1630, 1640 of the structure when the lowest design frequency range(s) are reached.

The frequency dependent couplings 1690 may be implemented using meander line structures. The meander line structures may take various forms such as interconnected, alternating, high and low impedance sections disposed over a conductive surface. The frequency dependent couplings may also take the form of a Variable Impedance Transmission Line (VITL) that consists of a meandering metallic transmission line with gradually decreasing section lengths, with interspersed dielectric portions to isolate the conductive segments. Specific embodiments of the VITL structure may further include electroactive actuators that alter the spacing between dielectric and metal layers to provide a Tunable Variable Impedance Transmission Line (TVITL). U.S. Pat. No. 9,147,936, incorporate herein by reference, describes example antenna arrays, frequency-dependent couplings, and surrounding controllable ground planes in more detail.

As shown in FIG. 27, the array 160 may typically be mounted within or below the surface 200 of a vehicle body panel such as a roof, hood, or trunk. The installation of the array 160 may be conformal to the roof surface by placing the array 160 in a cavity 1950. Frequency-dependent couplings 1690, such as meander lines, may couple ground plane 1640 to one or more conductive sidewalls of the cavity 1950. An alternate arrangement is to place each subarray, or even each cylindrical radiating element, in its own cavity, as shown in FIG. 28.

The cavity 1950 or cavit(ies) may be formed by cutting out a section or section(s) of a metal vehicle body panel and covering the cavity with a cover or insert 210 that conforms to the rest of the panel surface. The insert 210 should be formed of a radio frequency transparent material such as plastic, fiberglass or some other dielectric. In other embodiments, the entire body panel 200, 210 may itself be formed of a uniform sheet of plastic, fiberglass or some other dielectric material.

Ground plane surfaces 1601, 1630, 1640 may be disposed beneath elements 1600 as per FIG. 27, or above them that is (closer to or aligned with cover 210) as per FIG. 28.

In other implementations, the array 160 may be embedded in a transparent body panel such as a moonroof. In that configuration, the radiative surfaces of the antenna elements may be formed of an optically transparent, conductive material such as Indium Tin Oxide (ITO), metal coated glass, graphene film or the like.

Figure 29:
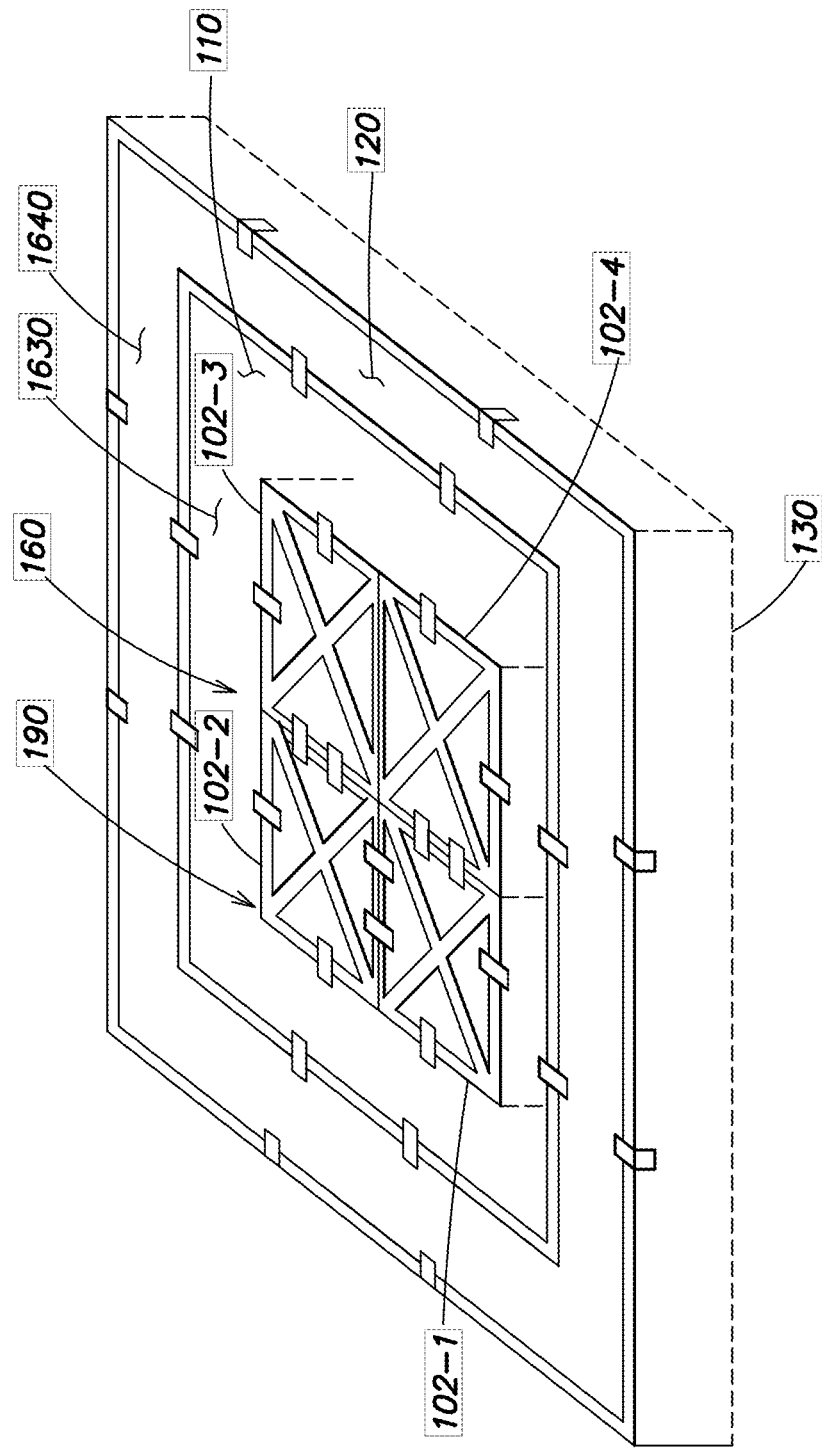
FIG. 29 is another implementation.

In other embodiments, as shown in FIG. 29, the radiating array 190 may be formed from subarrays 102-1, 102-2, 102-3, 102-4 that each take the form of a generally rectangular (or other quadrilateral) radiating structure with four facing triangular conductive sections. The triangular sections are electrically connected into two crossed, bow-tie structures. Beamforming circuits (not shown but described in the other patents and applications incorporated by reference) provide orientation-independent operation. With this arrangement of conductive surfaces, coverage can be provided in a hemispherical radiation pattern from the horizon to the zenith (or nadir, depending on installation orientation) using a planar, conformal structure. As with the FIG. 26 implementation, one or more surrounding ground planes 1630, 1640 are selectively coupled to the array.

Figure 30:
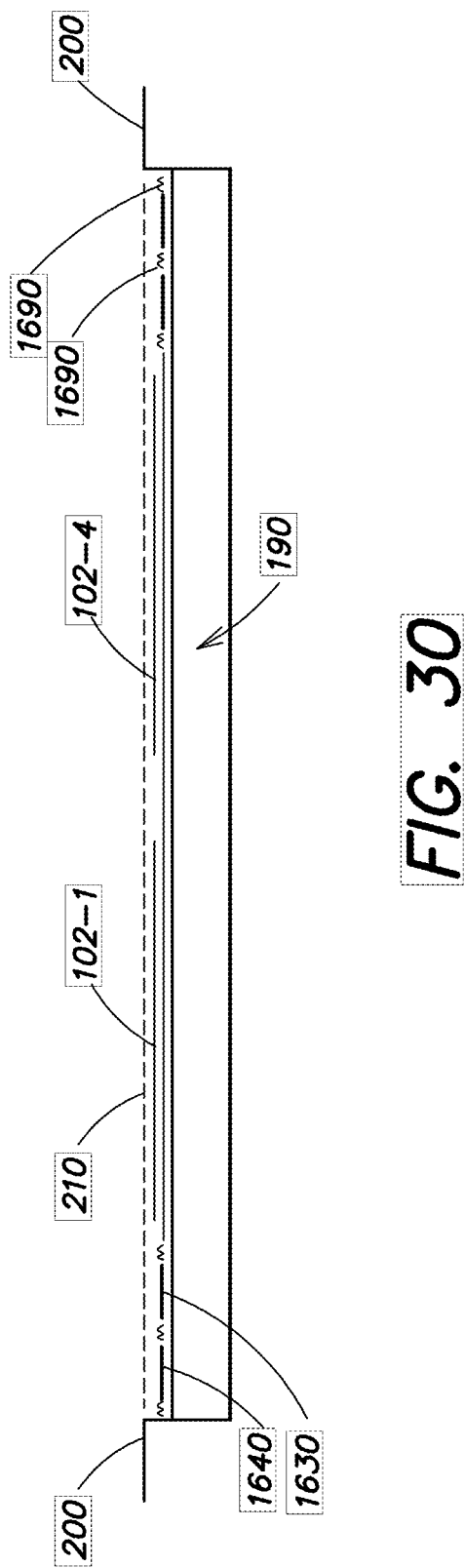
FIG. 30 is a cross-sectional view of FIG. 29.

As shown in FIG. 30, this version of the array 190 may also be disposed within a conductive cavity. In this implementation, the frequency-dependent couplings 1690 are also disposed between the outermost surrounding ground plane 1640 and the cavity walls.

Figure 31:
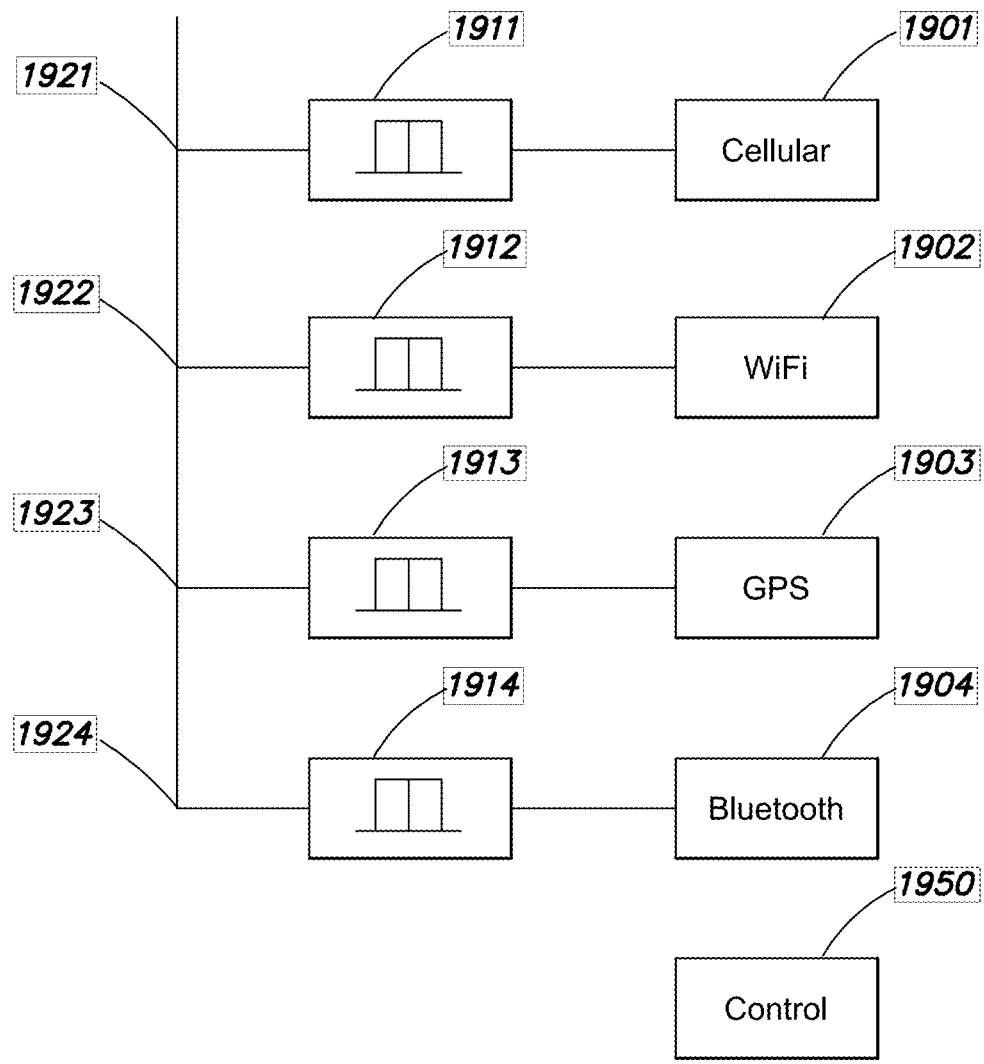
FIG. 31 is a beamforming subassembly.

The orientation-independent antenna may be scaled to support Radio Frequency (RF) communication at desired frequency bands. It may be desirable to create simultaneous, arbitrary beams on different frequency bands such as widely used 4G or 5G cellular, WiFi, GPS, or Bluetooth bands. As shown in FIG. 31, the arrays of volumetric elements may be configured with a separate beamformer 1901, 1902, 1903, 1904 for each frequency band. Respective bandpass filters 1911, 1912, 1913, 1914 and reactive splitters 1921, 1922, 1923, 1924 may be inserted in-line between the beamformers and the array elements.

The orientation independent directional antenna array 190 may also be used with systems that control one or more aspects of the vehicle in which it resides. In one such use, array 190 is used with Directional Finding (DF), Angle of Arrival (AOA) or distance measuring (ranging) circuits or suitable programmed digital processors. In one example shown in FIG. 32, such an in-vehicle system 700 may use directional antenna 190 to determine a location, including direction of travel 705, of another device 710 external to the vehicle 720. The other device 720 may be a smartphone, key fob, or other radio frequency device controlled by an authorized user 740 of the vehicle 720. In-vehicle system 700 then controls some operational aspect of vehicle 720 based on detected direction 705 of movement. For example, system 700 may unlock driver's side door 750 but not unlock other doors or trunk when user 740 travels in direction 705 towards the drivers side within a certain radius or perimeter of vehicle 720. In another scenario, the vehicle door 750 may lock when the authorized user 740 walks away from the vehicle, or when an unknown user 740 approaches an unlocked vehicle 720.

While various apparatus and methods have been particularly shown and described with references to example embodiments thereof, it will be understood by those skilled in the art that various changes in form and details may be made therein without departing from the scope of the invention(s) encompassed by the appended claims.

What is claimed is:

1. An antenna for use in a vehicle comprising:
   a cavity having conductive walls;
   a plurality of radiating surfaces disposed in a reference plane located above the cavity, wherein each radiating surface comprises a quadrilateral surface having four sides, with a group of four quadrilateral surfaces comprising an orientation-independent radiator, and wherein a plurality of orientation-independent radiators are disposed in further groups of four, thereby providing at least four groups of four quadrilateral surfaces for a total of at least sixteen quadrilateral surfaces, with the radiating surfaces further disposed in a defined pattern wherein at least one side of a selected quadrilateral surface of a selected orientation-independent radiator is aligned in parallel with a least one side of another quadrilateral surface of another orientation-independent radiator within the reference plane,
   a plurality of frequency dependent couplings, each frequency dependent coupling disposed between a respective one of the radiating surfaces of the selected orientation-independent radiator and the other orientation-independent radiator and/or a ground plane element, the frequency dependent couplings configured to decouple the four radiating surfaces in each group at a first operating frequency band, and configure to also couple together the four radiating surfaces in each group at a second operating frequency band; and
   with a surface area of each quadrilateral surface comprising an orientation-independent radiator responsive within the first operating frequency band, and with a collective surface area of the four quadrilateral surfaces within each group of four quadrilateral surfaces together comprising another orientation-independent radiator responsive at the second operating frequency band, wherein the second operating frequency band is lower in frequency than the first operating frequency band.

2. The antenna of claim 1 additionally wherein:
   the cavity is disposed below a body panel of the vehicle.

3. The antenna of claim 1 additionally wherein
   the ground plane element comprises one or more surrounding ground plane surfaces, disposed adjacent to the radiators and in line with or below the reference plane, the ground plane surfaces electrically surrounding all of the quadrilateral surfaces.

4. The antenna of claim 1 additional comprising:
   further frequency selective couplings disposed between the at least sixteen quadrilateral surface, and configured to short all sixteen quadrilateral surfaces together at a third frequency band.

5. The antenna of claim 1 additionally comprising:
   a first set of feed points, each feed point in the first set arranged for operating the antenna with the first operating frequency band; and
   a second set of feed points, each feed point in the second set arranged for operating the antenna within the second frequency band.

6. The antenna of claim 5, further adapted for controlling access to the vehicle, the antenna further comprising:
   a plurality of connections from the first and second set of feedpoints to a detector circuit, the detector circuit arranged for detecting, with the antenna, a relative position of a remote device, when the remote device moves closer than a defined distance to the vehicle operating a selected vehicle door, the selected vehicle door depending on the relative position of the remote device with respect to the vehicle.

* * * * *